(12) United States Patent
Baudouin et al.

(10) Patent No.: US 9,095,187 B2
(45) Date of Patent: *Aug. 4, 2015

(54) ARTICLE OF FOOTWEAR INCORPORATING A KNITTED COMPONENT

(71) Applicant: NIKE, Inc., Beaverton, OR (US)

(72) Inventors: Alexandre Baudouin, Portland, OR (US); James Molyneux, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,605

(22) Filed: May 9, 2014

(65) Prior Publication Data

US 2014/0245547 A1 Sep. 4, 2014

Related U.S. Application Data

(63) Continuation of application No. 13/944,675, filed on Jul. 17, 2013.

(60) Provisional application No. 61/727,010, filed on Nov. 15, 2012.

(51) Int. Cl.
*A43B 23/02* (2006.01)
*B29C 65/02* (2006.01)
(Continued)

(52) U.S. Cl.
CPC ... *A43B 1/04* (2013.01); *A43B 5/06* (2013.01); *A43B 7/20* (2013.01); *A43B 23/0205* (2013.01);
(Continued)

(58) Field of Classification Search
CPC ............ A43B 23/026; A43B 23/0235; A43B 23/0255
USPC ............... 156/583.3, 308.2, 309.6; 12/146 C, 12/146 CK
See application file for complete search history.

(56) References Cited

U.S. PATENT DOCUMENTS 601,192 A 3/1898 Woodside
1,215,198 A 2/1917 Rothstein
(Continued)

FOREIGN PATENT DOCUMENTS

DE 870963 C 3/1953
DE 1084173 6/1960
(Continued)

OTHER PUBLICATIONS

Declaration of Dr. Edward C. Frederick from the US Patent and Trademark Office Inter Partes Review of U.S. Appl. No. 7/347,011 (178 pp).

(Continued)

*Primary Examiner* — Scott W Dodds
(74) *Attorney, Agent, or Firm* — Plumsea Law Group, LLC

(57) ABSTRACT

An article of footwear has an upper and a sole structure secured to the upper. The upper includes a knitted component and, in some configurations, a skin layer secured to the knitted component. The knitted component may have a plurality of protruding areas that extend outward and away from a void within the upper for receiving a foot of a wearer. The protruding areas may include one or both of (a) a first tubular structure and an inlaid strand extending through the first tubular structure and (b) a second tubular structure and yarn sections extending across the second tubular structure.

20 Claims, 33 Drawing Sheets

(51) Int. Cl.
*A43B 1/04* (2006.01)
*A43D 8/00* (2006.01)
*A43B 5/06* (2006.01)
*A43B 7/20* (2006.01)
*A43B 23/07* (2006.01)
*A43B 23/08* (2006.01)
*A43B 23/26* (2006.01)
*D04B 1/22* (2006.01)

(52) U.S. Cl.
CPC .......... *A43B 23/026* (2013.01); *A43B 23/0235* (2013.01); *A43B 23/0245* (2013.01); *A43B 23/0255* (2013.01); *A43B 23/0275* (2013.01); *A43B 23/07* (2013.01); *A43B 23/088* (2013.01); *A43B 23/26* (2013.01); *A43D 8/00* (2013.01); *B29C 65/02* (2013.01); *D04B 1/22* (2013.01); *D10B 2501/043* (2013.01)

(56) References Cited

U.S. PATENT DOCUMENTS

| | | |
|---|---|---|
| 1,597,934 A | 8/1926 | Stimpson |
| 1,888,172 A | 11/1932 | Joha |
| 1,902,780 A | 3/1933 | Holden et al. |
| 1,910,251 A | 5/1933 | Joha |
| 2,001,293 A | 5/1935 | Wilson |
| 2,047,724 A | 7/1936 | Zuckerman |
| 2,147,197 A * | 2/1939 | Glidden .................. 36/9 R |
| 2,314,098 A | 3/1943 | McDonald |
| 2,330,199 A | 9/1943 | Basch |
| 2,343,390 A | 4/1944 | Ushakoff |
| 2,400,692 A | 5/1946 | Herbert |
| 2,440,393 A | 4/1948 | Clark |
| 2,569,764 A | 10/1951 | Jonas |
| 2,586,045 A | 2/1952 | Hoza |
| 2,608,078 A | 8/1952 | Anderson |
| 2,641,004 A | 6/1953 | Whiting et al. |
| 2,675,631 A | 4/1954 | Doughty |
| 2,994,322 A | 8/1961 | Cullen et al. |
| 3,583,081 A | 6/1971 | Hayashi |
| 3,694,940 A | 10/1972 | Stohr |
| 3,704,474 A | 12/1972 | Winkler |
| 3,766,566 A | 10/1973 | Tadokoro |
| 3,778,856 A | 12/1973 | Christie et al. |
| 3,952,427 A | 4/1976 | Von den Benken et al. |
| 3,972,086 A | 8/1976 | Belli et al. |
| 4,027,402 A | 6/1977 | Liu et al. |
| 4,031,586 A | 6/1977 | Von den Benken et al. |
| 4,053,995 A | 10/1977 | Shein |
| 4,211,806 A | 7/1980 | Civardi et al. |
| 4,232,458 A | 11/1980 | Bartels |
| 4,255,949 A | 3/1981 | Thorneburg |
| 4,258,480 A | 3/1981 | Famolare, Jr. |
| 4,317,292 A | 3/1982 | Melton |
| 4,373,361 A | 2/1983 | Thorneburg |
| 4,447,967 A | 5/1984 | Zaino |
| 4,465,448 A | 8/1984 | Aldridge |
| 4,607,439 A | 8/1986 | Harada |
| 4,737,396 A | 4/1988 | Kamat |
| 4,750,339 A | 6/1988 | Simpson et al. |
| 4,756,098 A | 7/1988 | Boggia |
| 4,785,558 A | 11/1988 | Shiomura |
| 4,813,158 A | 3/1989 | Brown |
| 5,031,423 A | 7/1991 | Ikenaga |
| 5,095,720 A | 3/1992 | Tibbals, Jr. |
| 5,117,567 A | 6/1992 | Berger |
| 5,152,025 A | 10/1992 | Hirmas |
| 5,192,601 A | 3/1993 | Neisler |
| 5,345,638 A | 9/1994 | Nishida |
| 5,353,524 A | 10/1994 | Brier |
| 5,371,957 A | 12/1994 | Gaudio |
| 5,461,884 A | 10/1995 | McCartney et al. |
| 5,511,323 A | 4/1996 | Dahlgren |
| 5,572,860 A | 11/1996 | Mitsumoto et al. |
| 5,575,090 A | 11/1996 | Condini |
| 5,623,840 A | 4/1997 | Roell |
| 5,729,918 A | 3/1998 | Smets |
| 5,735,145 A | 4/1998 | Pernick |
| 5,746,013 A | 5/1998 | Fay, Sr. |
| 5,765,295 A | 6/1998 | Ludemann et al. |
| 5,884,419 A | 3/1999 | Davidowitz et al. |
| 5,996,189 A | 12/1999 | Wang |
| 6,029,376 A | 2/2000 | Cass |
| 6,032,387 A | 3/2000 | Johnson |
| 6,052,921 A | 4/2000 | Oreck |
| 6,088,936 A | 7/2000 | Bahl |
| 6,151,802 A | 11/2000 | Reynolds |
| 6,170,175 B1 | 1/2001 | Funk |
| 6,308,438 B1 | 10/2001 | Throneburg et al. |
| 6,333,105 B1 | 12/2001 | Tanaka et al. |
| 6,401,364 B1 | 6/2002 | Burt |
| 6,558,784 B1 | 5/2003 | Norton et al. |
| 6,588,237 B2 | 7/2003 | Cole et al. |
| 6,754,983 B2 | 6/2004 | Hatfield et al. |
| 6,910,288 B2 | 6/2005 | Dua |
| 6,922,917 B2 | 8/2005 | Kerns et al. |
| 6,931,762 B1 | 8/2005 | Dua |
| D517,297 S | 3/2006 | Jones et al. |
| 7,051,460 B2 | 5/2006 | Orei et al. |
| 7,056,402 B2 | 6/2006 | Koerwien et al. |
| 7,347,011 B2 | 3/2008 | Dua et al. |
| 7,441,348 B1 | 10/2008 | Dawson |
| 7,543,397 B2 | 6/2009 | Kilgore et al. |
| 7,568,298 B2 | 8/2009 | Kerns |
| 7,682,219 B2 | 3/2010 | Falla |
| 8,490,299 B2 | 7/2013 | Dua et al. |
| 2002/0078599 A1 | 6/2002 | Delgorgue et al. |
| 2002/0148258 A1 | 10/2002 | Cole et al. |
| 2003/0126762 A1 | 7/2003 | Tseng |
| 2003/0191427 A1 | 10/2003 | Jay et al. |
| 2004/0118018 A1 | 6/2004 | Dua |
| 2004/0181972 A1 | 9/2004 | Csorba |
| 2005/0016023 A1 | 1/2005 | Burris et al. |
| 2005/0115284 A1 | 6/2005 | Dua |
| 2005/0193592 A1 | 9/2005 | Dua et al. |
| 2005/0273988 A1 | 12/2005 | Christy |
| 2005/0284000 A1 | 12/2005 | Kerns |
| 2006/0059715 A1 | 3/2006 | Aveni |
| 2006/0162187 A1 | 7/2006 | Byrnes et al. |
| 2007/0022627 A1 | 2/2007 | Sokolowski et al. |
| 2007/0180730 A1 | 8/2007 | Greene et al. |
| 2007/0294920 A1 | 12/2007 | Baychar |
| 2008/0017294 A1 | 1/2008 | Bailey et al. |
| 2008/0078102 A1 | 4/2008 | Kilgore et al. |
| 2008/0110048 A1 | 5/2008 | Dua et al. |
| 2008/0189830 A1 | 8/2008 | Egglesfield |
| 2008/0313939 A1 | 12/2008 | Ardill |
| 2009/0068908 A1 | 3/2009 | Hinchcliff |
| 2010/0037483 A1* | 2/2010 | Meschter et al. .................. 36/47 |
| 2010/0051132 A1 | 3/2010 | Glenn |
| 2010/0154256 A1* | 6/2010 | Dua .............. 36/25 R |
| 2010/0170651 A1 | 7/2010 | Scherb et al. |
| 2010/0175276 A1 | 7/2010 | Dojan et al. |
| 2011/0030244 A1 | 2/2011 | Motawi et al. |
| 2011/0078921 A1 | 4/2011 | Greene et al. |
| 2011/0088285 A1 | 4/2011 | Dojan et al. |
| 2012/0233882 A1 | 9/2012 | Huffa et al. |
| 2012/0233884 A1 | 9/2012 | Greene |
| 2012/0246973 A1 | 10/2012 | Dua |
| 2012/0255201 A1 | 10/2012 | Little |

FOREIGN PATENT DOCUMENTS

| | | |
|---|---|---|
| DE | 19738433 | 4/1998 |
| DE | 19728848 | 1/1999 |
| EP | 0728860 | 11/1981 |
| EP | 0448714 | 10/1991 |
| EP | 0758693 | 2/1997 |
| EP | 0279950 A2 | 8/1998 |
| EP | 0898002 A2 | 2/1999 |
| EP | 1233091 | 8/2002 |
| EP | 1437057 A1 | 7/2004 |
| EP | 1563752 A1 | 8/2005 |

(56) References Cited

FOREIGN PATENT DOCUMENTS

| | | |
|---|---|---|
| EP | 1602762 A1 | 12/2005 |
| EP | 1972706 A1 | 9/2008 |
| EP | 2649898 | 10/2013 |
| FR | 2171172 | 9/1973 |
| GB | 538865 | 8/1941 |
| GB | 7822562 | 9/1957 |
| GB | 2018837 A | 10/1979 |
| GB | 1603487 | 11/1981 |
| JP | H06113905 | 4/1994 |
| JP | H08109553 | 4/1996 |
| JP | H11302943 | 11/1999 |
| NL | 7304678 | 10/1974 |
| WO | 0032861 | 5/2000 |
| WO | 0231247 | 4/2002 |
| WO | 9003744 | 7/2004 |

OTHER PUBLICATIONS

David J. Spencer, Knitting Technology: A Comprehensive Handbook and Practical Guide (Thid ed., Woodhead Publishing Ltd. 2001) (413 pp).
Excerpt of Hannelore Eberle et al., Clothing Technology (Third English ed., Beuth-Verlag GmnH 2002) (book cover and back; pp. 2-3, 83).
International Search Report and Written Opinion in connection with PCT/US2009/056795 mailed on Apr. 20, 2010.
International Search Report and Written Opinion in connection with PCT/US2012/028576 mailed on Oct. 1, 2012.
International Search Report and Written Opinion in connection with PCT/US2012/028559 mailed on Oct. 19, 2012.
International Search Report and Written Opinion in connection with PCT/US2012/028534 mailed on Oct. 17, 2012.
International Preliminary Report on Patentability in connection with PCT/US2012/028534 mailed Sep. 17, 2013.
International Preliminary Report on Patentability in connection with PCT/US2012/028576 mailed Sep. 17, 2013.
International Search Report and Written Opinion in connection with PCT/US2013/068841 mailed on Mar. 13, 2014.
International Search Report and Written Opinion in connection with PCT/US2013/068839 mailed on Mar. 13, 2014.
International Search Report and Written Opinion in connection with PCT/US2013/068843 mailed on Mar. 13, 2014.
International Search Report and Written Opinion in connection with PCT/US2013/068845 mailed on Jun. 24, 2014.
Letter from Bruce Huffa dated Dec. 23, 2013 (71 Pages).
International Preliminary Report on Patentability (including Written Opinion of the ISA) mailed May 28, 2015 in International Application No. PCT/US2013/068843.
Office Action mailed May 26, 2015 for Taiwan Applicaion No. 102141571 filed Nov. 15, 2013.

* cited by examiner

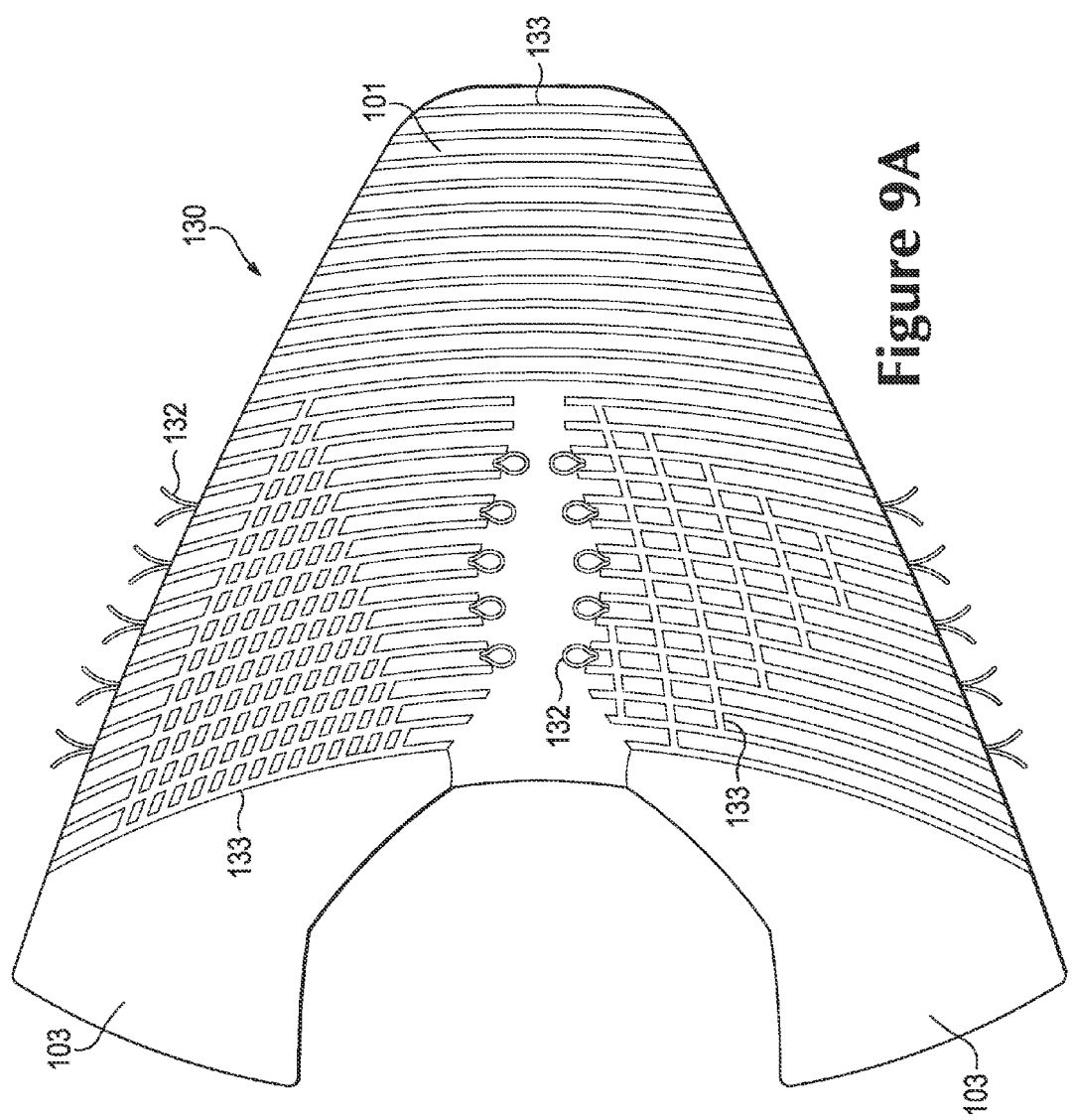

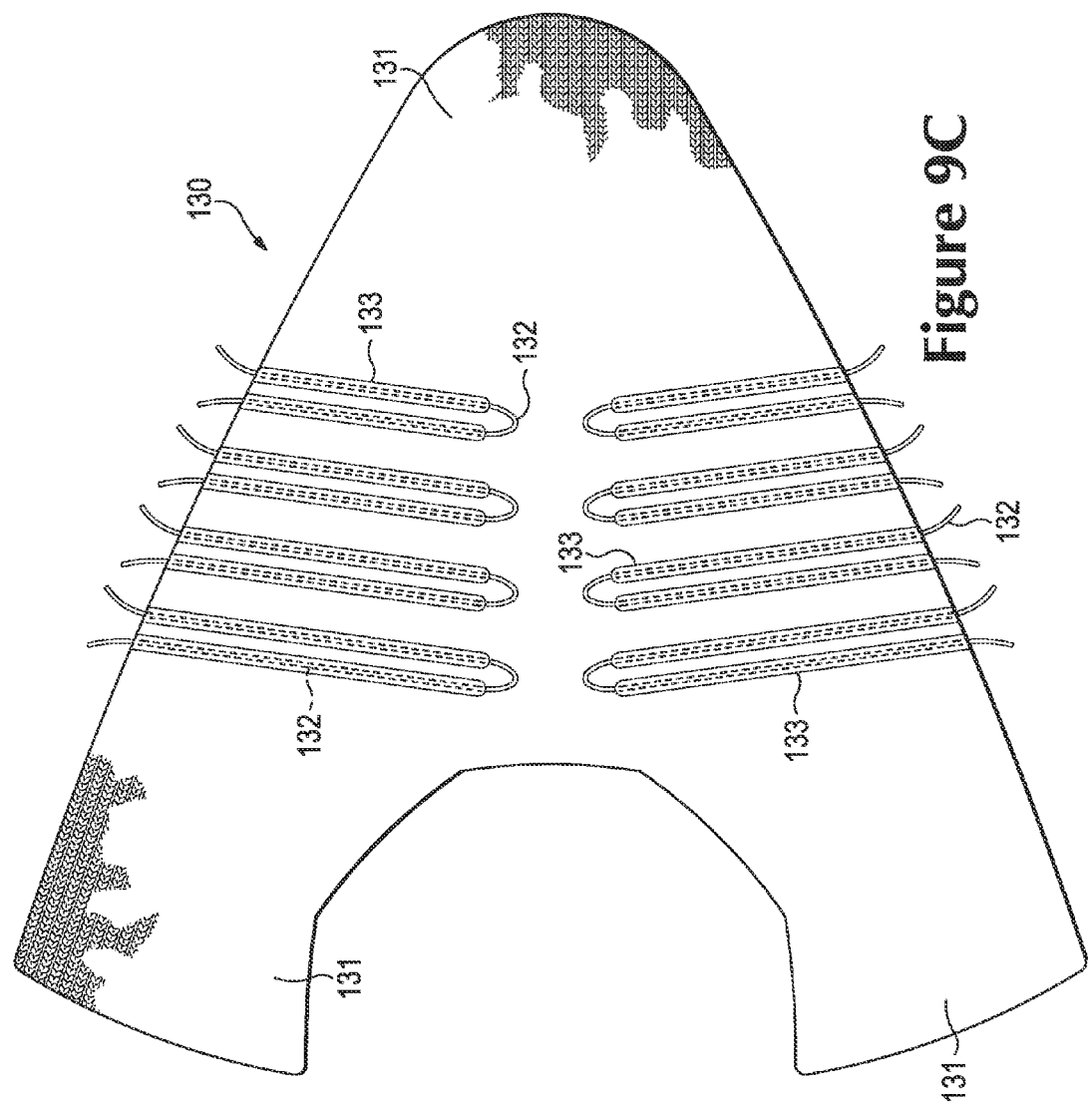

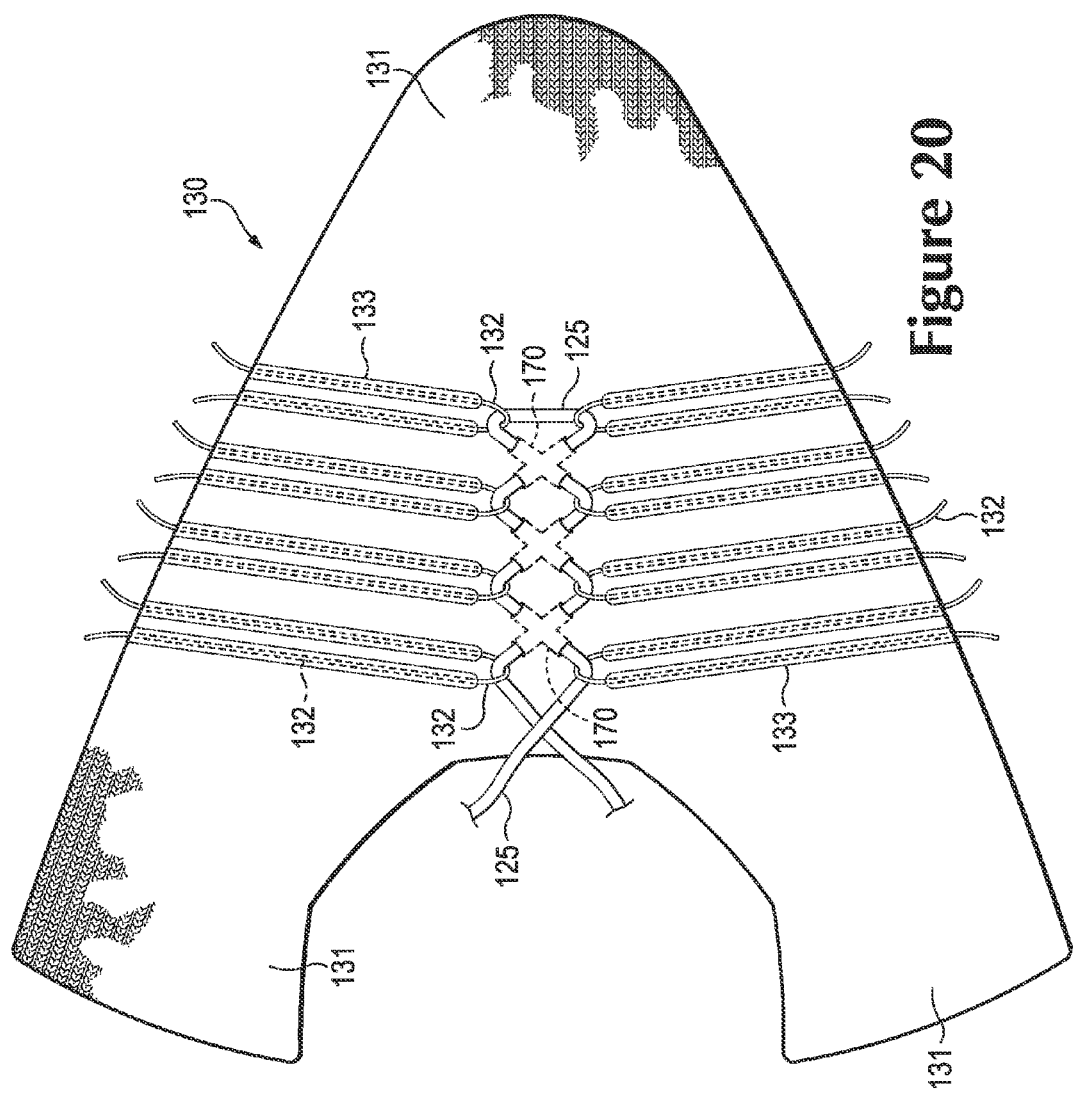

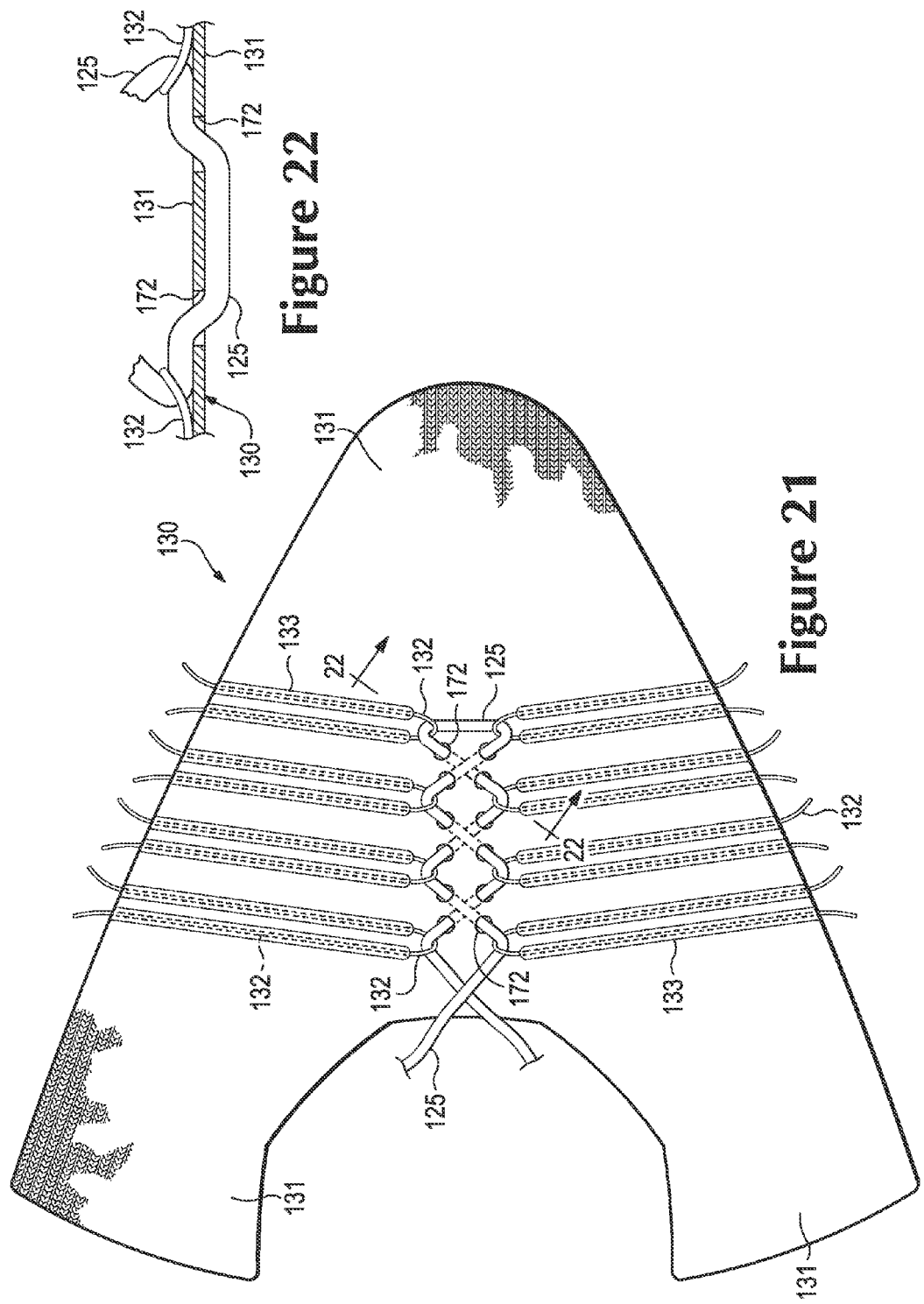

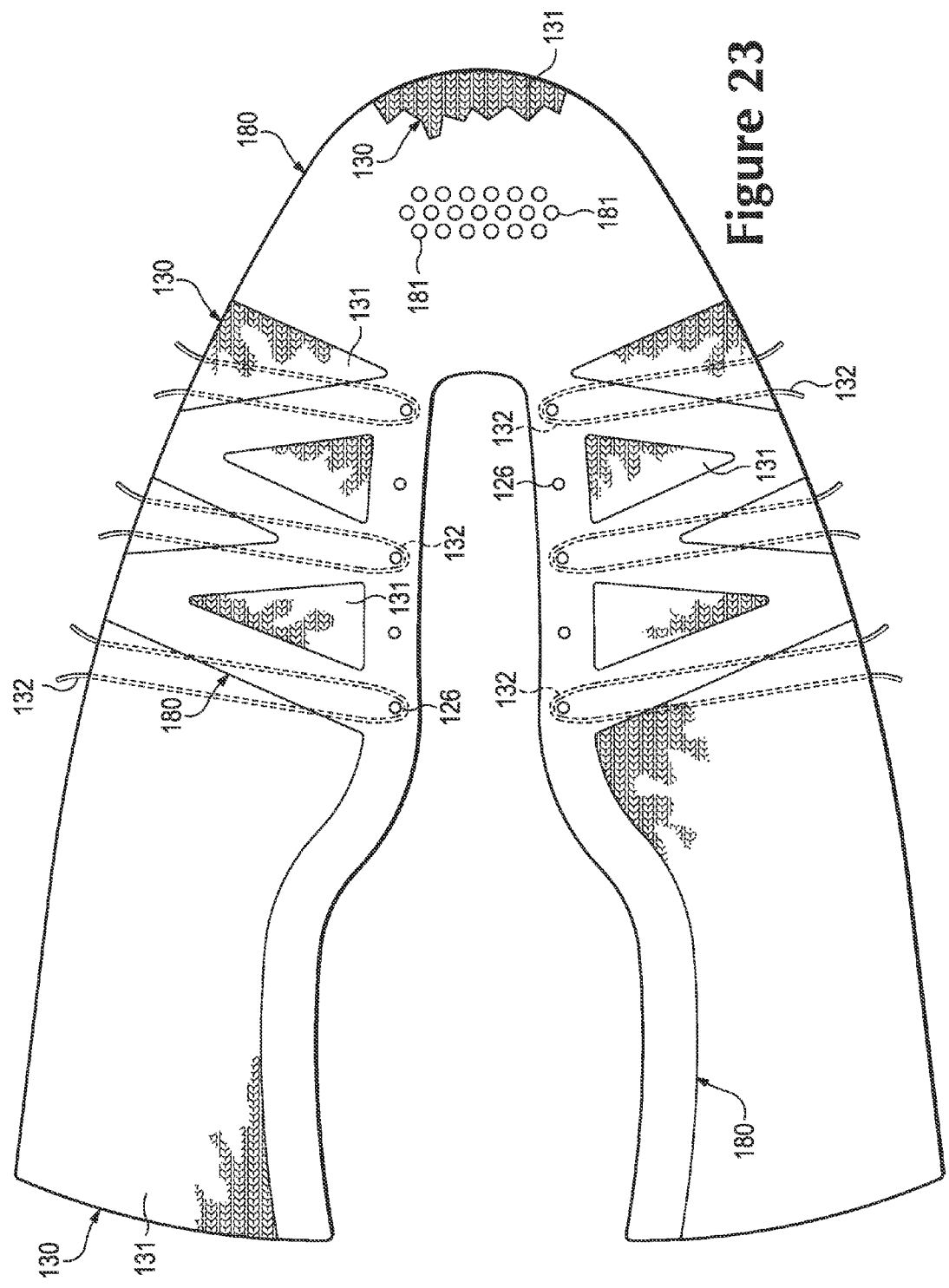

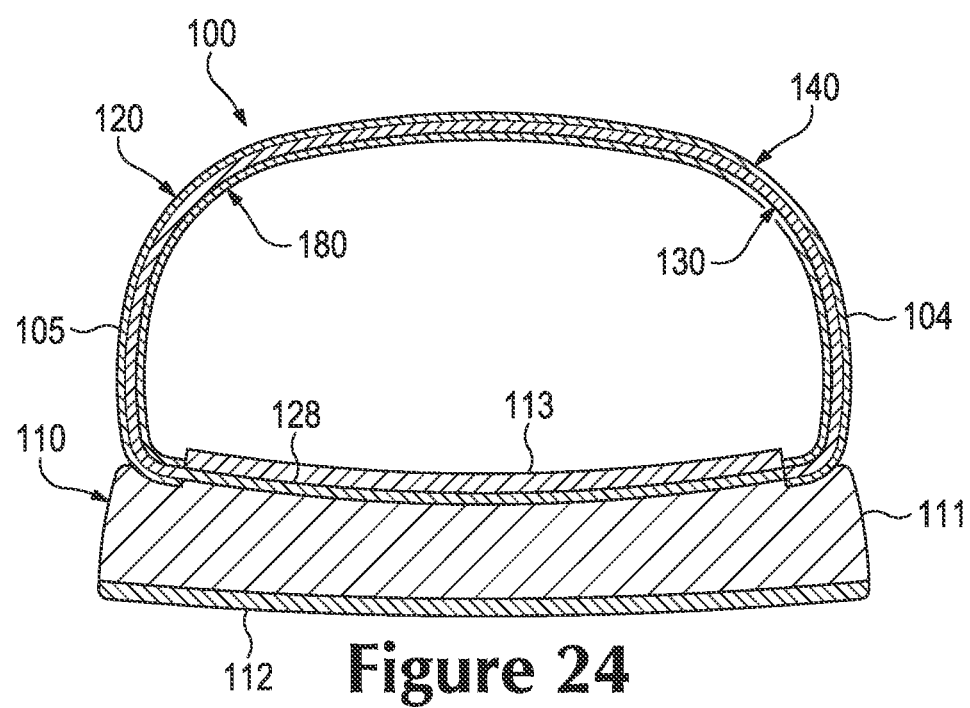

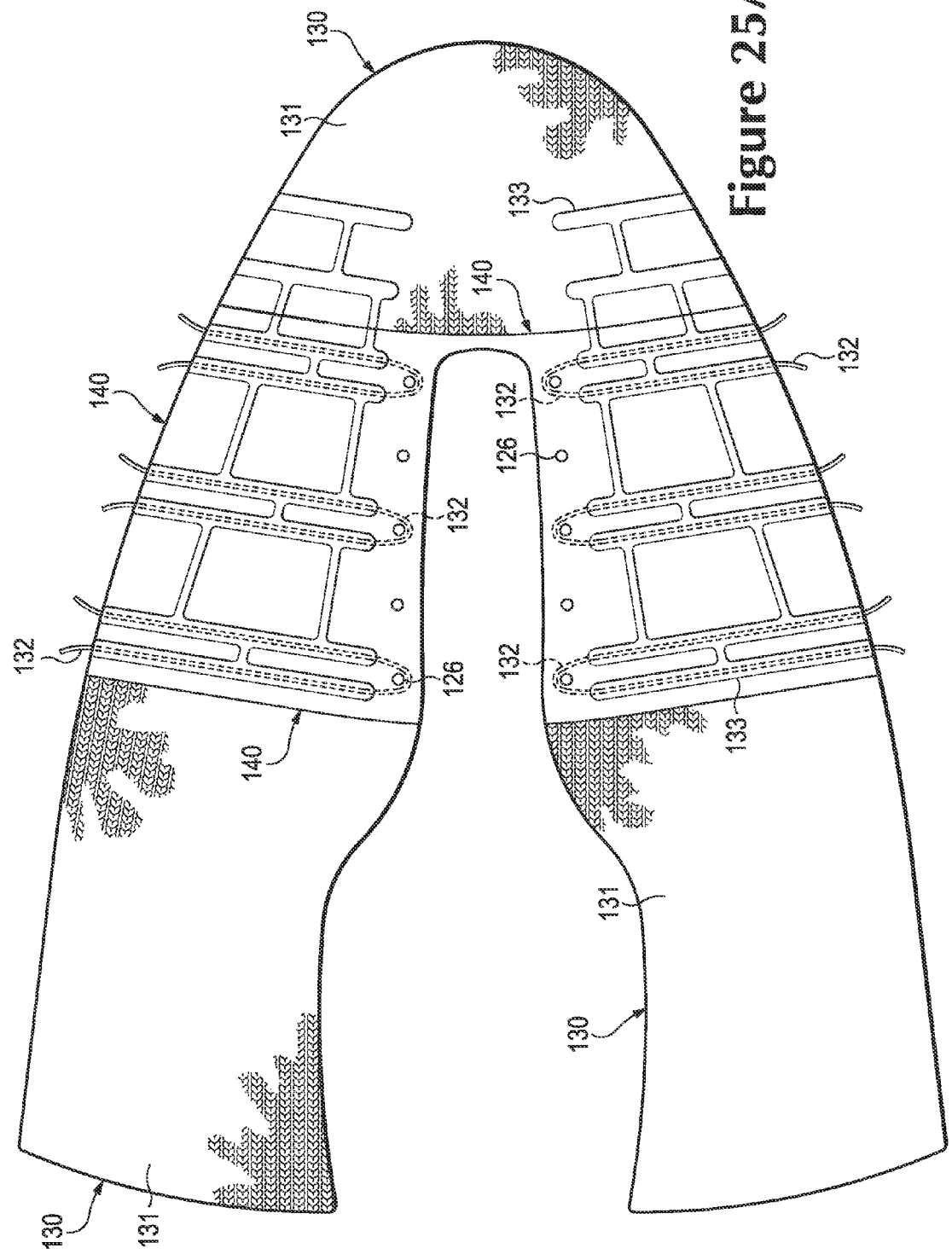

ARTICLE OF FOOTWEAR INCORPORATING A KNITTED COMPONENT

CROSS-REFERENCE TO RELATED APPLICATIONS

This application is a continuation of U.S. patent application Ser. No. 13/944,675, filed on Jul. 17, 2013, entitled "Article Of Footwear Incorporating A Knitted Component", which application is non-provisional patent application that claims priority under 35 U.S.C. §119(e) to U.S. Provisional Patent Application Ser. No. 61/727,010, which was filed in the U.S. Patent and Trademark Office on Nov. 15, 2012 and entitled "Article Of Footwear Incorporating A Knitted Component," the disclosures of each of which applications are entirely incorporated herein by reference.

BACKGROUND

Conventional articles of footwear generally include two primary elements, an upper and a sole structure. The upper is secured to the sole structure and forms a void on the interior of the footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole is secured to a lower surface of the midsole and forms a ground-engaging portion of the sole structure that is formed from a durable and wear-resistant material. The sole structure may also include a sockliner positioned within the void and proximal a lower surface of the foot to enhance footwear comfort.

The upper generally extends over the instep and toe areas of the foot, along the medial and lateral sides of the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

Various materials are conventionally utilized in manufacturing the upper. The upper of athletic footwear, for example, may be formed from multiple material elements. The materials may be selected based upon various properties, including stretch-resistance, wear-resistance, flexibility, air-permeability, compressibility, and moisture-wicking, for example. With regard to an exterior of the upper, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior. Accordingly, the other areas of the exterior may be formed from a synthetic textile, for example. The exterior of the upper may be formed, therefore, from numerous material elements that each impart different properties to the upper. An intermediate or central layer of the upper may be formed from a lightweight polymer foam material that provides cushioning and enhances comfort. Similarly, an interior of the upper may be formed of a comfortable and moisture-wicking textile that removes perspiration from the area immediately surrounding the foot. The various material elements and other components may be joined with an adhesive or stitching. Accordingly, the conventional upper is formed from various material elements that each impart different properties to various areas of the footwear.

SUMMARY

An article of footwear has an upper and a sole structure secured to the upper. In various configurations, the upper includes a knitted component having a plurality of protruding areas that extend outward and away from a void within the upper for receiving a foot of a wearer. The protruding areas include one or both of (a) a first tubular structure and an inlaid strand extending through the first tubular structure and (b) a second tubular structure and yarn sections extending across the second tubular structure. In addition, a skin layer may be secured to the knitted component.

A method for manufacturing an upper for an article of footwear may include positioning a skin layer adjacent to a knitted component and in an overlapping configuration, the knitted component having regions with different thicknesses. The skin layer and the knitted component may be located between a first surface and a second surface of a press. The first surface includes a first material, and the second surface includes a second material, the first material having greater compressibility than the second material. In addition, the skin layer and the knitted component may be compressed between the first surface and the second surface to join the skin layer to the knitted component.

An article of footwear has an upper and a sole structure secured to the upper. In various configurations, the upper includes a foot region and an ankle region. The foot region covers at least a portion of a foot of a wearer and includes a foot part of a knitted component. The ankle region covers at least a portion of an ankle of the wearer and includes an ankle part of the knitted component. The foot part and the ankle part of the knitted component are formed from unitary knit construction. The foot region has a first degree of stretch and the ankle region has a second degree of stretch, with the first degree of stretch being less than the second degree of stretch.

An article of footwear has an upper and a sole structure secured to the upper. In various configurations, the upper includes a knitted component extending through a throat area of the upper. The knitted component defines a channel in the throat area, with the channel including two overlapping knit layers formed of unitary knit construction. The upper also includes a plurality of lace-receiving elements located on opposite sides of the throat area, two of the lace-receiving elements are located adjacent to opposite ends of the channel. A lace extends through the channel and engages the lace-receiving elements.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 9A-9C are top plan views depicting further configurations of the knitted component.

FIGS. 20 and 21 are top plan views of further configurations of the knitted component and a lace.

FIG. 22 is a cross-sectional view, as defined by section line 22 in FIG. 21.

FIG. 23 is a bottom plan view of a configuration of the knitted component that includes an interior layer.

FIG. 24 is a cross-sectional view of the article of footwear corresponding with FIG. 4A and depicting the interior layer.

FIGS. 25A and 25B are top plan views corresponding with FIG. 5 and depicting further configurations for the skin layer from an upper of the first configuration of the article of footwear.

DETAILED DESCRIPTION

Figure 1:
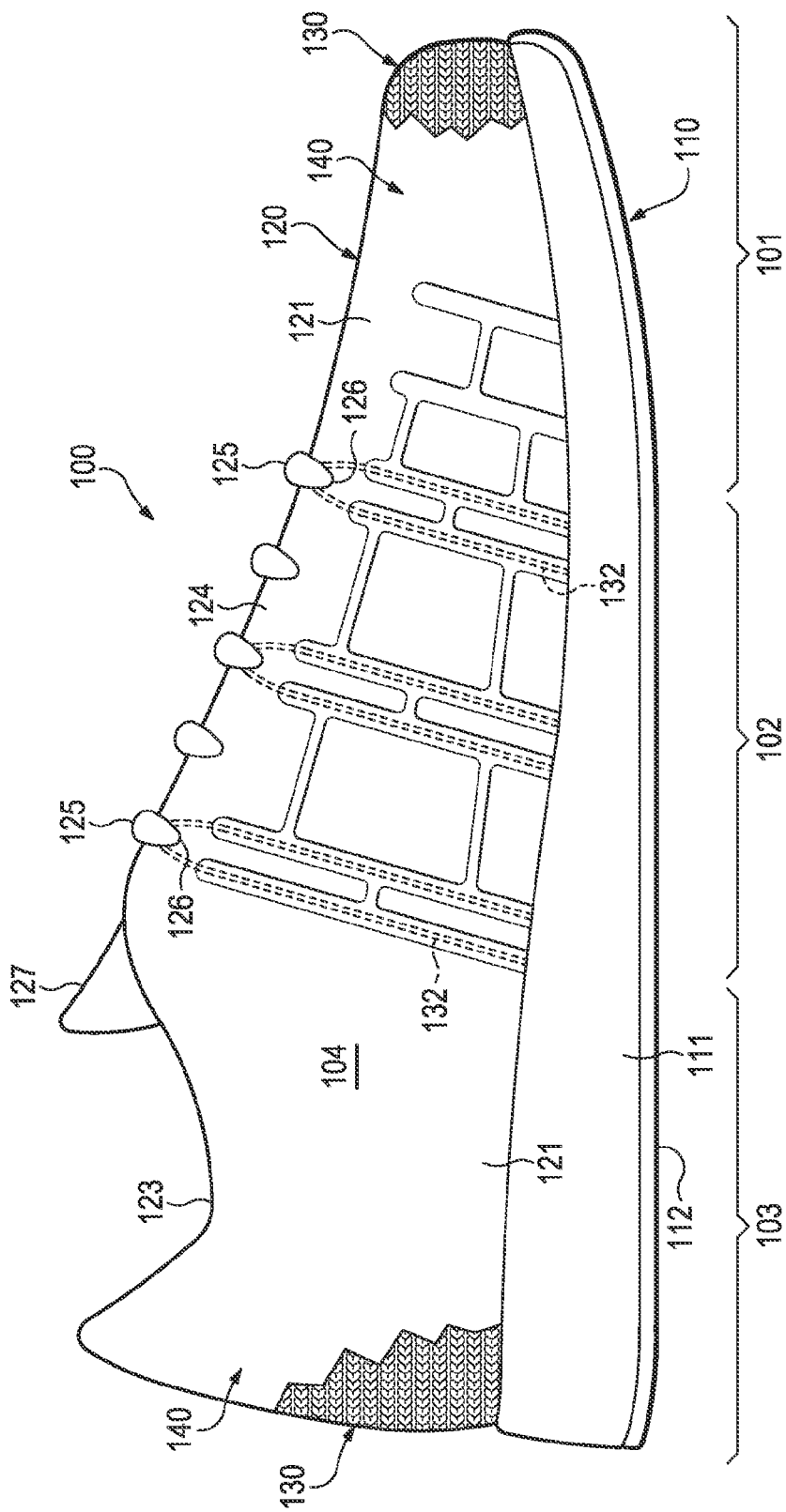
FIG. 1 is a lateral side elevational view of a first configuration of an article of footwear.

The following discussion and accompanying figures disclose an article of footwear having an upper that includes a knitted component and a skin layer. The article of footwear is disclosed as having a general configuration suitable for walking or running. Concepts associated with the footwear, including the upper, may also be applied to a variety of other athletic footwear types, including baseball shoes, basketball shoes, cross-training shoes, cycling shoes, football shoes, soccer shoes, sprinting shoes, tennis shoes, and hiking boots, for example. The concepts may also be applied to footwear types that are generally considered to be non-athletic, including dress shoes, loafers, sandals, and work boots. The concepts disclosed herein apply, therefore, to a wide variety of footwear types.

General Footwear Structure

An article of footwear 100 is depicted in FIGS. 1-4C as including a sole structure 110 and an upper 120. Whereas sole structure 110 is located under and supports a foot of a wearer, upper 120 provides a comfortable and secure covering for the foot. As such, the foot may be located within a void in upper 120 to effectively secure the foot within footwear 100 or otherwise unite the foot and footwear 100. Moreover, sole structure 110 is secured to a lower area of upper 120 and extends between the foot and the ground to attenuate ground reaction forces (i.e., cushion the foot), provide traction, enhance stability, and influence the motions of the foot, for example.

For reference purposes, footwear 100 may be divided into three general regions: a forefoot region 101, a midfoot region 102, and a heel region 103. Forefoot region 101 generally encompasses portions of footwear 100 corresponding with forward portions of the foot, including the toes and joints connecting the metatarsals with the phalanges. Midfoot region 102 generally encompasses portions of footwear 100 corresponding with middle portions of the foot, including an arch area. Heel region 103 generally encompasses portions of footwear 100 corresponding with rear portions of the foot, including the heel and calcaneus bone. Footwear 100 also includes a lateral side 104 and a medial side 105, which extend through each of regions 101-103 and correspond with opposite sides of footwear 100. More particularly, lateral side 104 corresponds with an outside area of the foot (i.e. the surface that faces away from the other foot), and medial side 105 corresponds with an inside area of the foot (i.e., the surface that faces toward the other foot). Regions 101-103 and sides 104-105 are not intended to demarcate precise areas of footwear 100. Rather, regions 101-103 and sides 104-105 are intended to represent general areas of footwear 100 to aid in the following discussion. In addition to footwear 100, regions 101-103 and sides 104-105 may also be applied to sole structure 110, upper 120, and individual elements thereof.

The primary elements of sole structure 110 are a midsole 111, an outsole 112, and a sockliner 113. Midsole 111 is secured to a lower surface of upper 120 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 111 may incorporate plates, moderators, fluid-filled chambers, lasting elements, or motion control members that further attenuate forces, enhance stability, or influence the motions of the foot, or midsole 111 may be primarily formed from a fluid-filled chamber. Outsole 112 is secured to a lower surface of midsole 111 and may be formed from a wear-resistant rubber material that is textured to impart traction. Sockliner 113 is located within the void in upper 120 and is positioned to extend under a lower surface of the foot to enhance the comfort of footwear 100. Although this configuration for sole structure 110 provides an example of a sole structure that may be used in connection with upper 120, a variety of other conventional or nonconventional configurations for sole structure 110 may also be utilized. Accordingly, the features of sole structure 110 or any sole structure utilized with upper 120 may vary considerably.

Upper 120 includes an exterior surface 121 and an opposite interior surface 122. Whereas exterior surface 121 faces outward and away from footwear 100, interior surface 122 faces inward and defines a majority or a relatively large portion of the void within footwear 100 for receiving the foot. The void is shaped to accommodate the foot. When the foot is located within the void, therefore, upper 120 extends along a lateral side of the foot, along a medial side of the foot, over the foot, around the heel, and under the foot. Moreover, interior surface 122 may lay against the foot or a sock covering the foot. Upper 120 also includes a collar 123 that is primarily located in heel region 103 and forms an opening that provides the foot with access to the void. More particularly, the foot may be inserted into upper 120 through the opening formed by collar 123, and the foot may be withdrawn from upper 120 through the opening formed by collar 123.

A throat area 124 of upper 120 is located forward of collar 123 and primarily in midfoot region 102. Although the extent of throat area 124 may vary, throat area 124 corresponds with an instep region or upper surface of the foot and includes a lace 125, a plurality of lace-receiving elements 126, and a tongue 127. Lace 125 engages the various lace-receiving elements 126 and follows a zigzagging path between lace-receiving elements 126. Moreover, lace 125 repeatedly-passes across throat area 124 and between opposite sides of throat area 124. When using footwear 100, lace 125 permits the wearer to modify dimensions of upper 120 to accommodate the proportions of the foot. More particularly, lace 125 may be manipulated in a conventional manner to permit the wearer to (a) tighten upper 120 around the foot and (b) loosen upper 120 to facilitate insertion and withdrawal of the foot from the void in upper 120 (i.e., through the opening formed by collar 123). Although lace-receiving elements 126 are depicted as apertures in upper 120, and with lace 125 passing through the apertures, lace-receiving elements 126 may be loops, eyelets, hooks, or D-rings.

Figure 3:
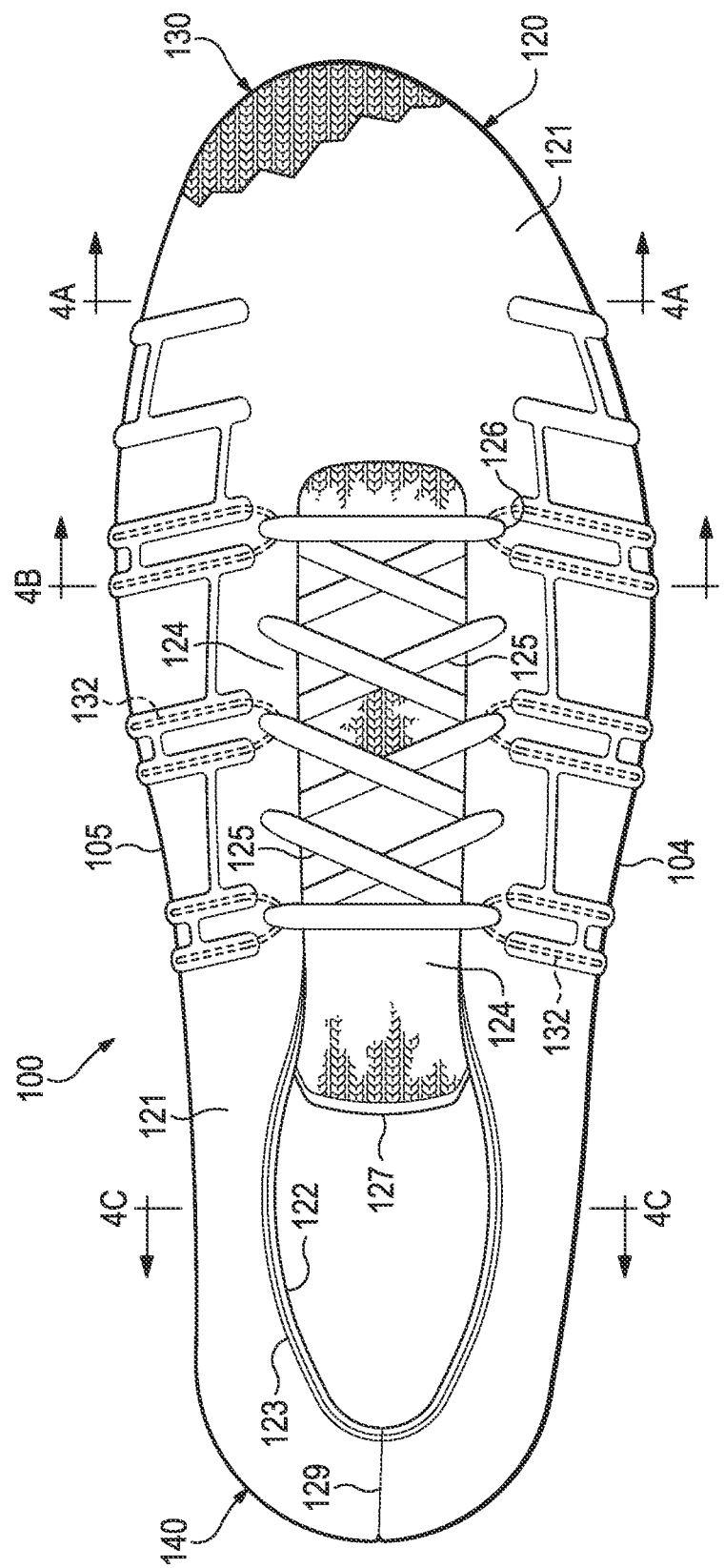
FIG. 3 is a top plan view of the first configuration of the article of footwear.
Figure 4A:
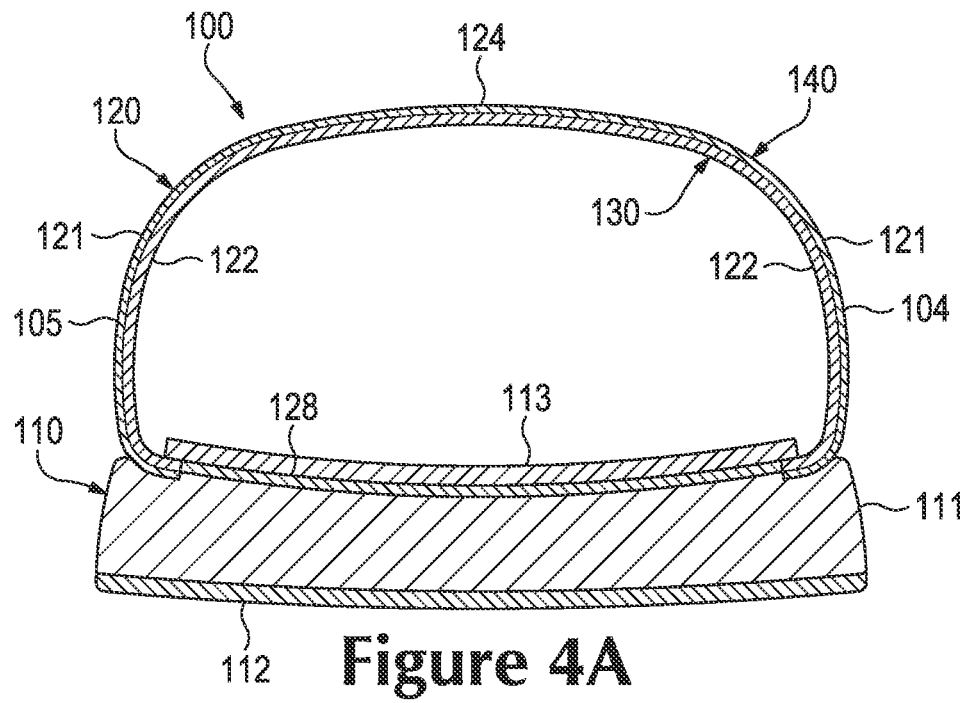
FIGS. 4A-4C are cross-sectional views of the first configuration of the article of footwear, as respectively defined by section lines 4A-4C in FIG. 3.
Figure 4B:
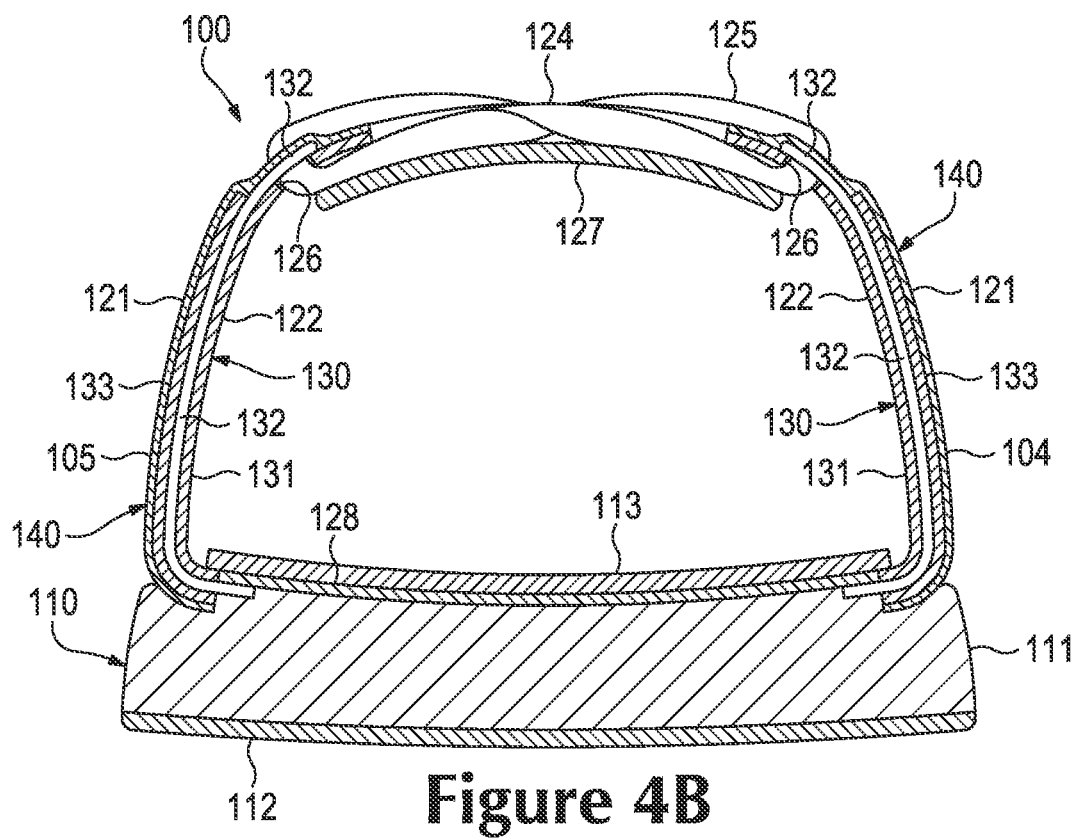
Figure 4C:
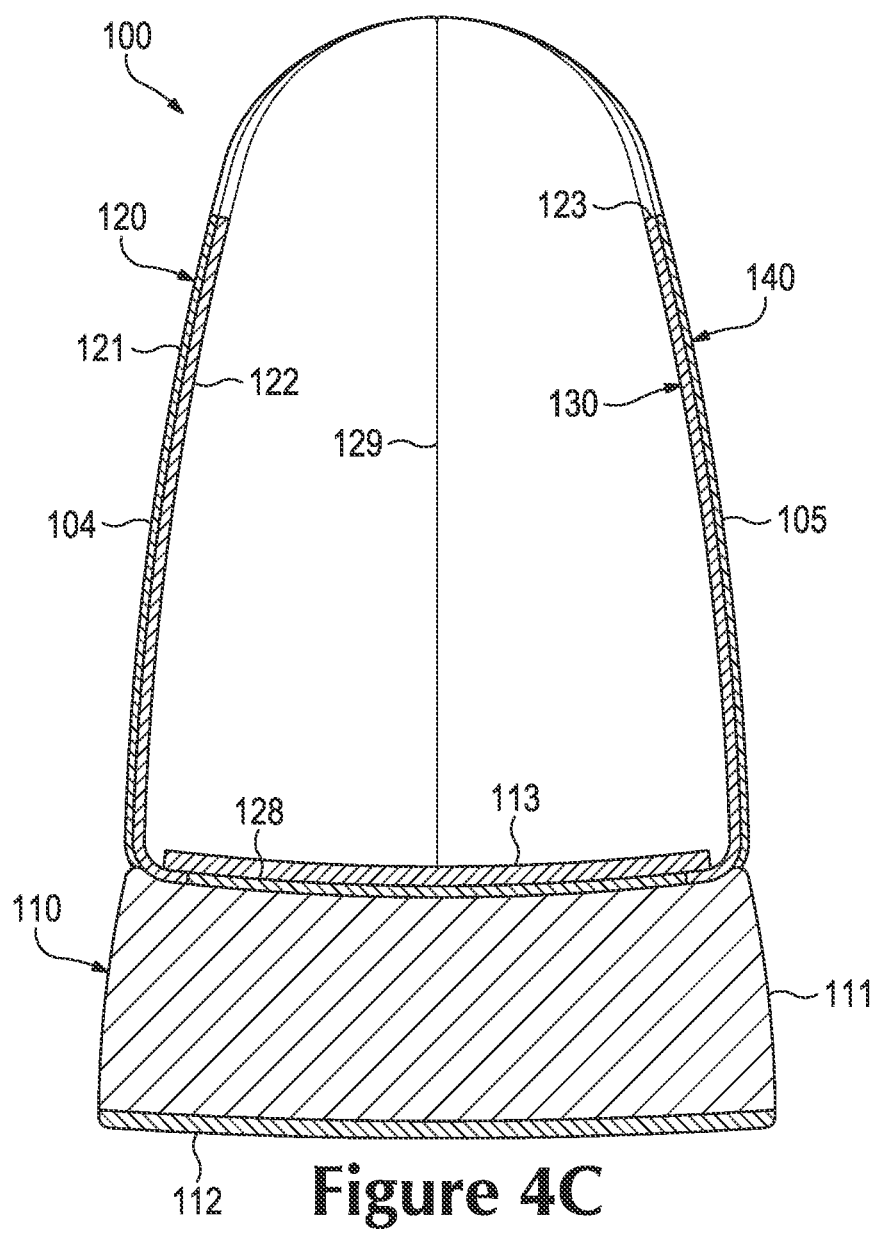
Figure 5:
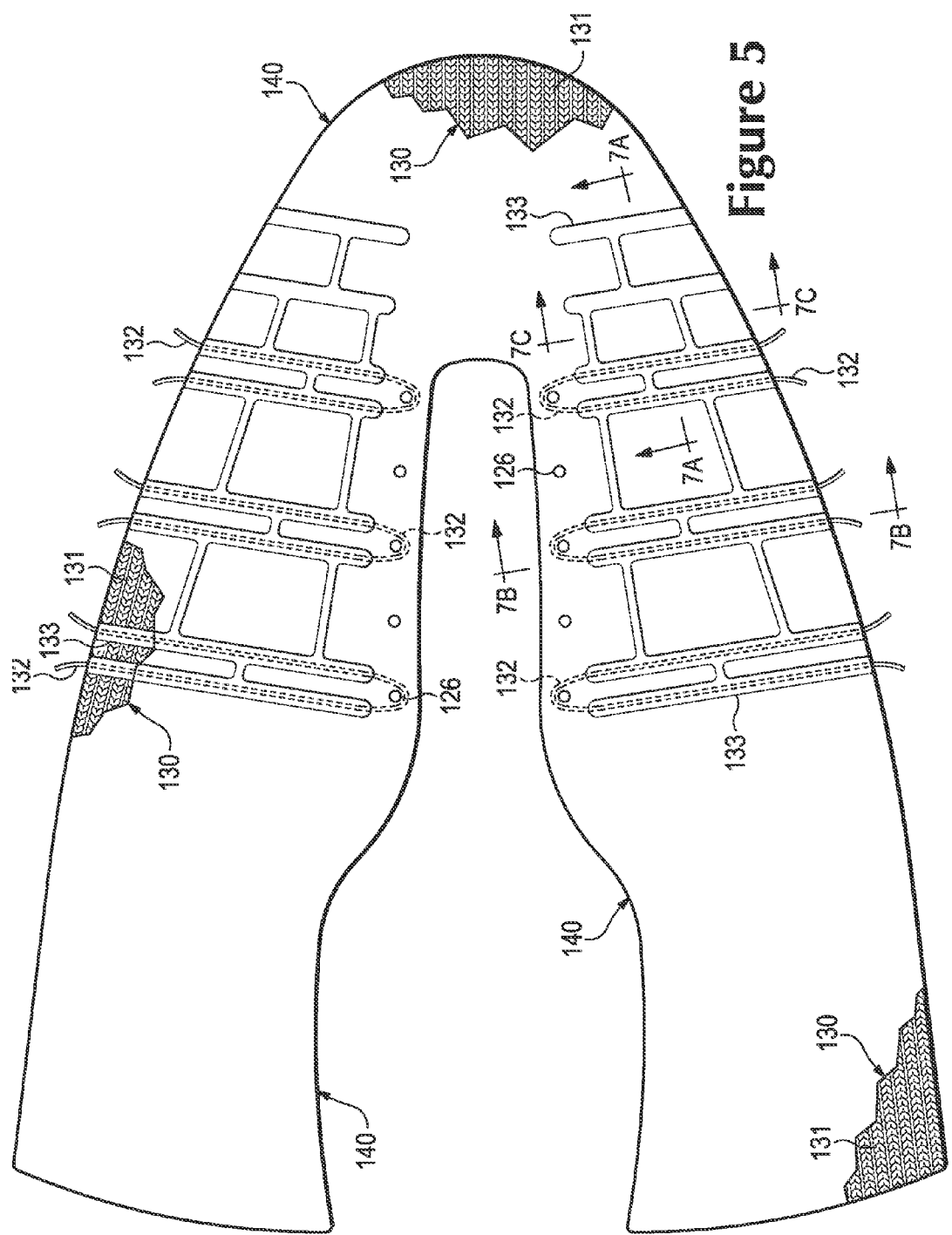
FIG. 5 is a top plan view of a knitted component and a skin layer from an upper of the first configuration of the article of footwear.
Figure 6:
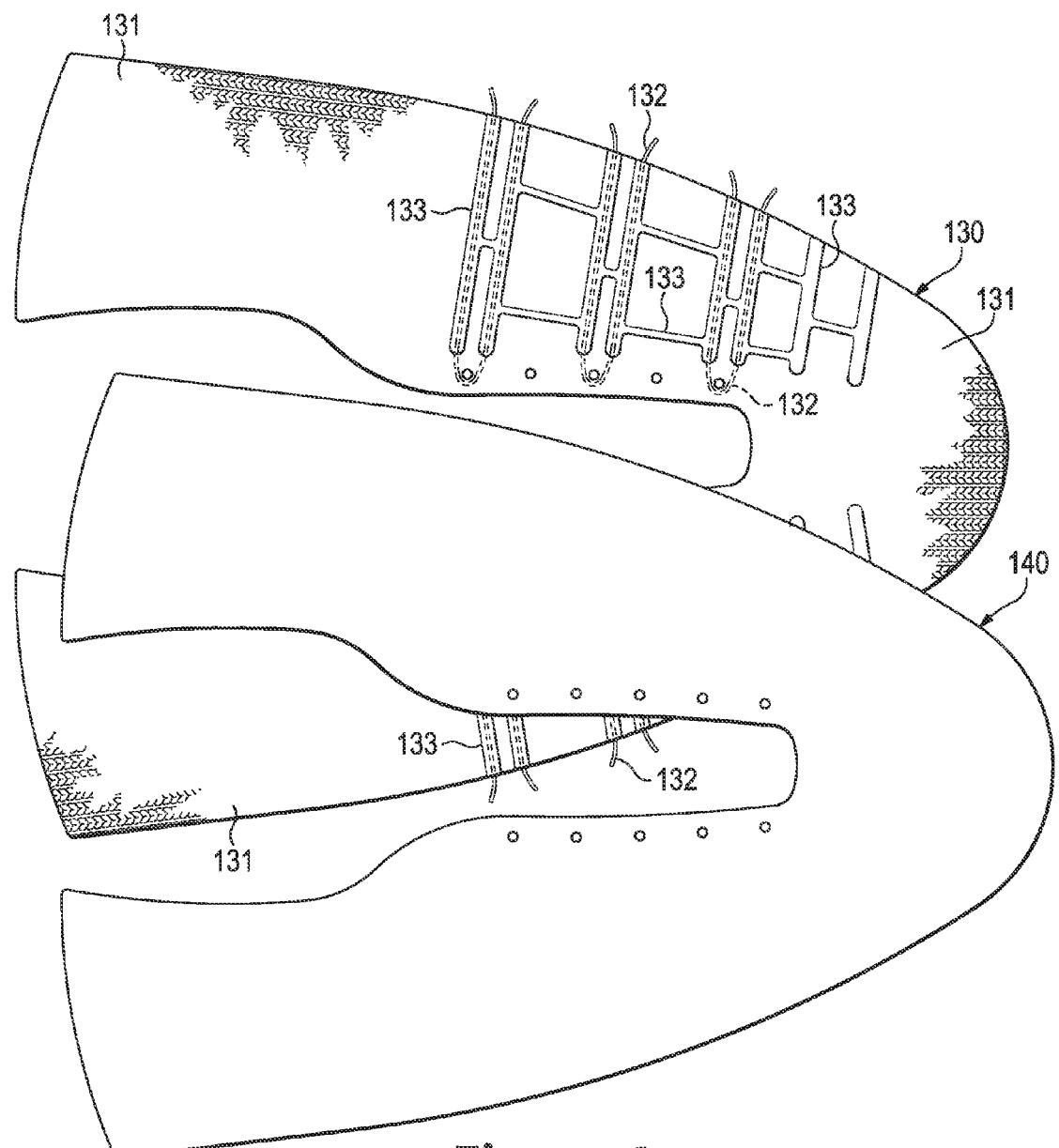
FIG. 6 is an exploded top plan view of the knitted component and the skin layer.

A majority of upper 120 is formed from a knitted component 130 and a skin layer 140, which are depicted separate from a remainder of footwear 100 in FIGS. 5 and 6. Knitted component 130 may, for example, be manufactured through a flat knitting process and extends through each of regions 101-103, along both lateral side 104 and medial side 105, over forefoot region 101, and around heel region 103. Although portions of knitted component 130 form exterior surface 121, knitted component 130 forms a majority or a relatively large portion of interior surface 122, thereby defining a portion of the void within upper 120. In some configurations, knitted component 130 may also extend under the foot. For purposes of example in various figures, however, a strobel sock 128 is secured to knitted component 130 and forms a majority of the portion of upper 120 that extends under the foot. In this configuration, sockliner 113 extends over strobel sock 128 and forms a surface upon which the foot rests. In addition, a seam 129 extends vertically through heel region 103, as depicted in FIGS. 3 and 4C, to join edges of knitted component 130.

Skin layer 140 lays adjacent to knitted component 130 and is secured to an exterior of knitted component 130, thereby forming a majority or a relatively large portion of exterior surface 121. Various materials may be utilized to form skin layer 140, including a polymer sheet, elements of leather or synthetic leather, a woven or non-woven textile, or a metal foil. As with knitted component 130, skin layer 140 extends through each of regions 101-103, along both lateral side 104 and medial side 105, over forefoot region 101, and around heel region 103. Skin layer 140 is depicted as being absent from portions of throat area 124 (e.g., tongue 127) and interior surface 122. In further configurations of footwear 100, skin layer 140 may be absent from other areas of upper 120 or may extend over portions of throat area 124 and into interior surface 122.

The combination of knitted component 130 and skin layer 140 provides various advantages to footwear 100. As an example, knitted component 130 and skin layer 140 impart a relatively tight and glove-like fit to upper 120 that secures the foot within footwear 100 during walking, running, and other ambulatory activities. When formed as a soccer shoe, for example, the relatively tight and glove-like fit may provide the wearer with enhanced feel and control of a ball. Skin layer 140 may also be utilized to reinforce areas of upper 120. For example, skin layer 140 may inhibit stretch in knitted component 130 and may enhance the wear-resistance or abrasion-resistance of upper 120. Skin layer 140 may also impart water-resistance to footwear 100. Additionally, forming footwear 100 in this configuration may provide a relatively light weight or mass, support for the foot, uniform fit and conformance to a shape of the foot, and a relatively seamless interior with enhanced comfort for the wearer.

The discussion above presents various features and elements of upper 120. In further configurations of footwear 100, however, upper 120 may also include one or more of (a) a heel counter in heel region 103 for enhancing stability, (b) a toe guard in forefoot region 101 that is formed of a wear-resistant material, and (c) logos, trademarks, and placards with care instructions and material information. Accordingly, upper 120 may incorporate a variety of other features and elements, in addition to the features and elements discussed herein and shown in the figures.

Knitted Component Configuration

Knitted component 130 extends throughout upper 120 and forms a majority of interior surface 122, thereby defining a portion of the void within upper 120. Although seams may be present in knitted component 130, a majority of knitted component 130 has a substantially seamless configuration. Moreover, knitted component 130 may be formed of unitary knit construction. As utilized herein, a knitted component (e.g., knitted component 130) is defined as being formed of "unitary knit construction" when formed as a one-piece element through a knitting process. That is, the knitting process substantially forms the various features and structures of knitted component 130 without the need for significant additional manufacturing steps or processes. Although portions of knitted component 130 may be joined to each other (e.g., edges of knitted component 130 being joined together, as at seam 129) following the knitting process, knitted component 130 remains formed of unitary knit construction because it is formed as a one-piece knit element. Moreover, knitted component 130 remains formed of unitary knit construction when other elements (e.g., lace 125, strobel sock 128 logos, trademarks, placards) are added following the knitting process. Examples of various configurations of knitted components that may be utilized for knitted component 130 are disclosed in U.S. Pat. No. 6,931,762 to Dua; U.S. Pat. No. 7,347,011 to Dua, et al.; U.S. Patent Application Publication 2008/0110048 to Dua, et al.; U.S. Patent Application Publication 2010/0154256 to Dua; and U.S. Patent Application Publication 20120233882 to Huffa, et al., each of which are entirely incorporated herein by reference.

The primary elements of knitted component 130 are a knit element 131 and an inlaid strand 132. Knit element 131 is formed from at least one yarn that is manipulated (e.g., with a knitting machine) to form a plurality of intermeshed loops that define a variety of courses and wales. That is, knit element 131 has the structure of a knit textile. Inlaid strand 132 extends through knit element 131 and passes between the various loops within knit element 131. Although inlaid strand 132 generally extends along courses within knit element 131, inlaid strand 132 may also extend along wales within knit element 131. Advantages of inlaid strand 132 include providing support, stability, and structure. For example, inlaid strand 132 assists with securing upper 120 around the foot, limits deformation in areas of upper 120 (e.g., imparts stretch-resistance), and operates in connection with lace 125 to enhance the fit of footwear 100. U.S. Patent Application Publication 20120233882 to Huffa, et al., which was referenced above and incorporated herein, provides discussion of the manner in which knitted component 130 may be formed, including the process of inlaying or otherwise locating inlaid strand 132 within knit element 131.

Knit element 131 may incorporate various types and combinations of stitches and yarns. With regard to stitches, the yarn forming knit element 131 may have one type of stitch in one area of knit element 131 and another type of stitch in another area of knit element 131. Depending upon the types and combinations of stitches utilized, areas of knit element 131 may have a plain knit structure, a mesh knit structure, or a rib knit structure, for example. The different types of stitches may affect the physical properties of knit element 131, including aesthetics, stretch, thickness, air permeability, and abrasion-resistance of knit element 131. That is, the different types of stitches may impart different properties to different areas of knitted component 130. With regard to yarns, knit element 131 may have one type of yarn in one area of knit element 131 and another type of yarn in another area of knit element 131. Depending upon various design criteria, knit element 131 may incorporate yarns with different deniers, materials (e.g., cotton, elastane, polyester, rayon, wool, and nylon), and degrees of twist, for example. The different types of yarns may affect the physical properties of knit element 131, including aesthetics, stretch, thickness, air permeability, and abrasion-resistance of knit element 131. That is, the different types of yarns may impart different properties to different areas of knitted component 130. By combining various types and combinations of stitches and yarns, each area of knit element 131 may have specific properties that enhance the comfort, durability, and performance of footwear 100. In some configurations, multiple yarns with different colors may be utilized to form knitted component 130. When yarns with different colors are twisted together and then knitted, knitted component 130 may have a heathered appearance with multiple colors randomly distributed throughout upper 120.

One or more of the yarns within knit element 131 may be partially formed from a thermoplastic polymer material, which softens or melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, thermoplastic polymer materials are often used to join two objects or elements together. In this case, a yarn incorporating thermoplastic polymer material may be utilized to join (a) the yarn to other portions of the yarn, (b) the yarn to other yarns, (c) the yarn to inlaid strand 132, or (d) knitted component 130 to skin layer 140, for example.

Figure 7A:
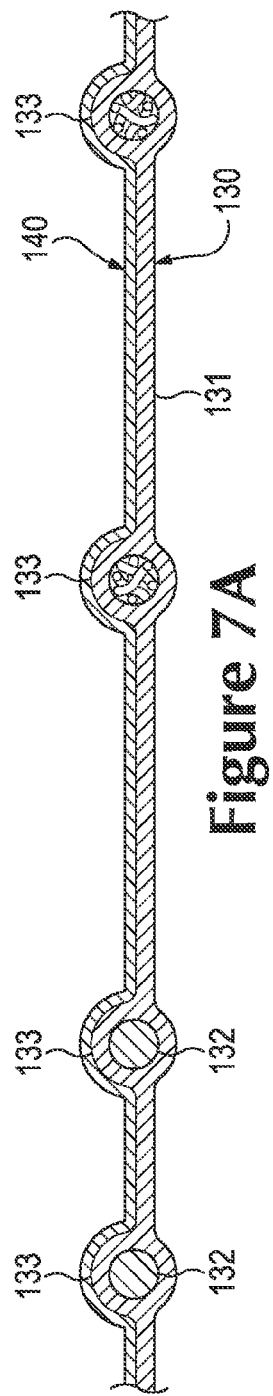
FIGS. 7A-7C are cross-sectional views of the knitted component and the skin layer, as respectively defined by section lines 7A-7C in FIG. 5.
Figure 7B:
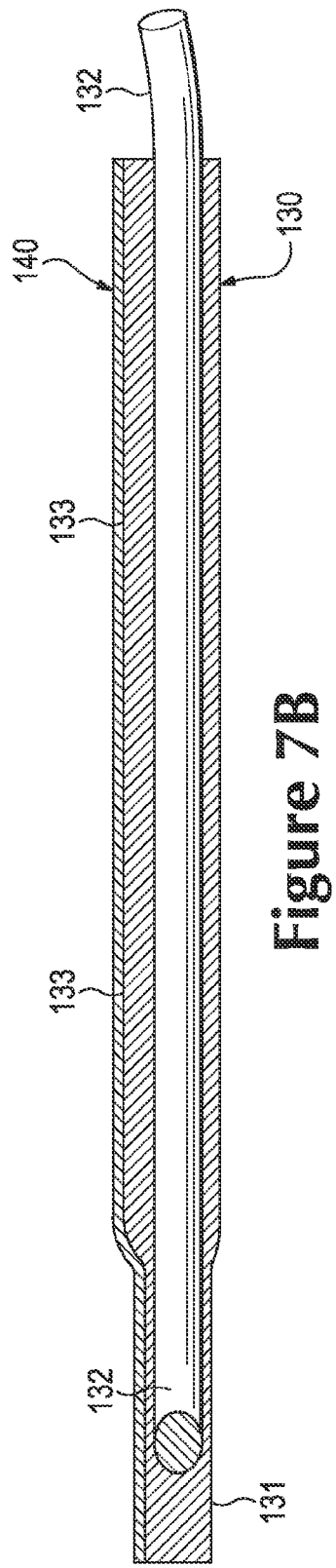

Inlaid strand 132, as noted above, extends through knit element 131 and passes between the various loops within knit element 131. More particularly, inlaid strand 132 is located within the knit structure of knit element 131. Referring to FIGS. 7A and 7B, for example, knit element 131 forms two separate and spaced textile layers, which effectively define a channel or tubular structure, and inlaid strand 132 is located between the spaced textile layers. In some configurations, however, knit element 131 may have the configuration of a single textile layer in the area of inlaid strand 132. In either configuration, inlaid strand 132 is located within knit element 131 and between opposite surfaces of knit element 131. Although inlaid strand 132 is primarily within knit element 131, portions of inlaid strand 132 may be visible or exposed on one or both surfaces of knit element 131.

When knitted component 130 is incorporated into footwear 100, inlaid strand 132 extends in a generally vertical direction and from throat area 124 to an area where sole structure 110 is secured to upper 120. More particularly, inlaid strand repeatedly passes through knit element 131 from throat area 124 to an area adjacent to sole structure 110. In throat area 124, inlaid strand may also extend around lace-receiving elements 126, there by forming loops through which lace 125 passes. In comparison with knit element 131, inlaid strand 132 may exhibit greater stretch-resistance. That is, inlaid strand 132 may stretch less than knit element 131. Given that numerous sections of inlaid strand 132 extend toward sole structure 110 from throat area 124, inlaid strand 132 imparts stretch-resistance to this area of upper 120. Moreover, placing tension upon lace 125 may impart tension to inlaid strand 132, thereby inducing the portion of upper 120 between throat area 124 and sole structure 110 to lay against the foot. As such, inlaid strand 132 operates in connection with lace 125 to assist with securing upper 120 around the foot and enhance the fit of footwear 100.

The configuration of inlaid strand 132 may vary significantly. In addition to yarn, inlaid strand 132 may have the configurations of a filament (e.g., a monofilament), thread, rope, webbing, cable, or chain, for example. In comparison with the yarns forming knit element 131, the thickness of inlaid strand 132 may be greater. In some configurations, inlaid strand 132 may have a significantly greater thickness than the yarns of knit element 131. Moreover, the materials forming inlaid strand 132 may include any of the materials for the yarn within knit element 131, such as cotton, elastane, polyester, rayon, wool, and nylon, but may also include metals and a variety of engineering filaments that are utilized for high tensile strength applications, including glass, aramids (e.g., para-aramid and meta-aramid), ultra-high molecular weight polyethylene, and liquid crystal polymer. As another example, a braided polyester thread may also be utilized as inlaid strand 132.

The combination of knitted component 130 and skin layer 140 provide various advantages to footwear 100. In some configurations, however, skin layer 140 may be absent from footwear 100. That is, knitted component 130 may be utilized individually to form portions of upper 120, and knitted component 130 may form a majority of relatively large portion of each of surfaces 121 and 122. Moreover, the presence of protruding areas 133 when skin layer 140 is absent may impart additional thickness or loft to upper 120, while also varying the stretch properties of upper 120. Although discussed in combination with skin layer 140, therefore, knitted component 130 may be utilized individually.

Skin Layer Configuration

Skin layer 140 lays adjacent to knitted component 130 and is secured to knitted component 130 to form a portion of exterior surface 121. As noted above, skin layer 140 may be formed from a polymer sheet, elements of leather or synthetic leather, a woven or non-woven textile, or a metal foil. When formed as a polymer sheet or polymer layer, skin layer 140 may initially be a polymer film, polymer mesh, polymer powder, or polymer resin, for example. With any of these structures, a variety of polymer materials may be utilized for skin layer 140, including polyurethane, polyester, polyester polyurethane, polyether polyurethane, and nylon. An example of a non-woven textile with thermoplastic polymer filaments that may be bonded to knitted component 130 is disclosed in U.S. Patent Application Publication 2010/0199406 to Dua, et al., which is incorporated herein by reference. Moreover, additional considerations relating to skin layer 140 may be found in U.S. Patent Application Publication 2012/0246973 to Dua, which is incorporated herein by reference.

Although skin layer 140 may be formed from a thermoset polymer material, many configurations of skin layer 140 are formed from thermoplastic polymer materials (e.g., thermoplastic polyurethane). In general, a thermoplastic polymer material softens or melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, the thermoplastic polymer material may be melted, molded, cooled, re-melted, re-molded, and cooled again through multiple cycles. Thermoplastic polymer materials may also be welded or thermal bonded to textile elements, such as knitted component 130.

In many configurations of footwear 100, a single element of skin layer 140 is secured throughout knitted component 130 and covers substantially all of knitted component 130. In further configurations, however, different elements of skin layer 140 may be formed from different materials and positioned in separate areas of knitted component 130. That is, a portion of skin layer 140 formed from one material may be bonded to one area of knitted component 130, and another portion of skin layer 140 formed from another material may be bonded to a different area of knitted component 130. By varying the materials forming skin layer 140, different properties may be applied to different areas of upper 120. In other configurations, skin layer 140 may only cover specific areas of knitted component 130, thereby leaving other areas of knitted component 130 exposed. Skin layer 140 may, therefore, be absent from some areas of knitted component 130.

Skin layer 140 is discussed above as being positioned on an exterior of knitted component 130. In some configurations, however, skin layer 140 may be bonded with an opposite surface of knitted component 130, thereby forming a portion of interior surface 122. In other configurations, two skin layers 140 may be bonded to opposite surfaces of knitted component 130, or skin layer 140 may impregnate or otherwise extend into knitted component 130.

Protruding Areas

Knitted component 130 includes a plurality of protruding areas 133 that extend outward and away from the void within upper 120. Protruding areas 133 form bulges, protrusions, bumps, or other outwardly-extending portions in knitted component 130. As with inlaid strand 132, many of protruding areas 133 extend in a generally vertical direction and from throat area 124 to the area where sole structure 110 is secured to upper 120. Some of protruding areas 133 correspond with and incorporate inlaid strand 132. In addition, some of protruding areas 133 extend in a generally horizontal direction and between two other protruding areas 133. That is, the horizontal protruding areas 133 extend between and effectively join with two of the vertical protruding areas 133. In addition to providing a unique aesthetic to footwear 100, protruding areas 133 may enhance the strength of upper 120 or impart a variety of different properties to upper 120.

Figure 7C:
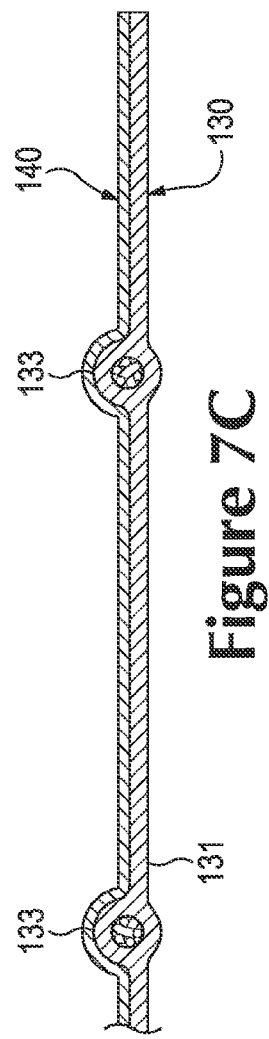

Skin layer 140 extends over protruding areas 133 and may be secured to protruding areas 133, as well as other areas of knitted component 130. As such, skin layer 140 forms corresponding bulges, protrusions, bumps, or other outwardly-extending portions at the locations of protruding areas 133 and on exterior surface 121, as depicted in FIGS. 7A and 7C, for example. An advantage of this configuration is that the friction properties of footwear 100 may be controlled through the specific pattern that protruding areas 133 form in upper 120. As an example, the combination of protruding areas 133 and skin layer 140 may provide enhanced control of a ball during the sport of soccer. That is, a soccer player may obtain enhanced control of a soccer ball through the raised or outwardly-extending portions of upper 120 that are formed by protruding areas 133.

Figure 8A:
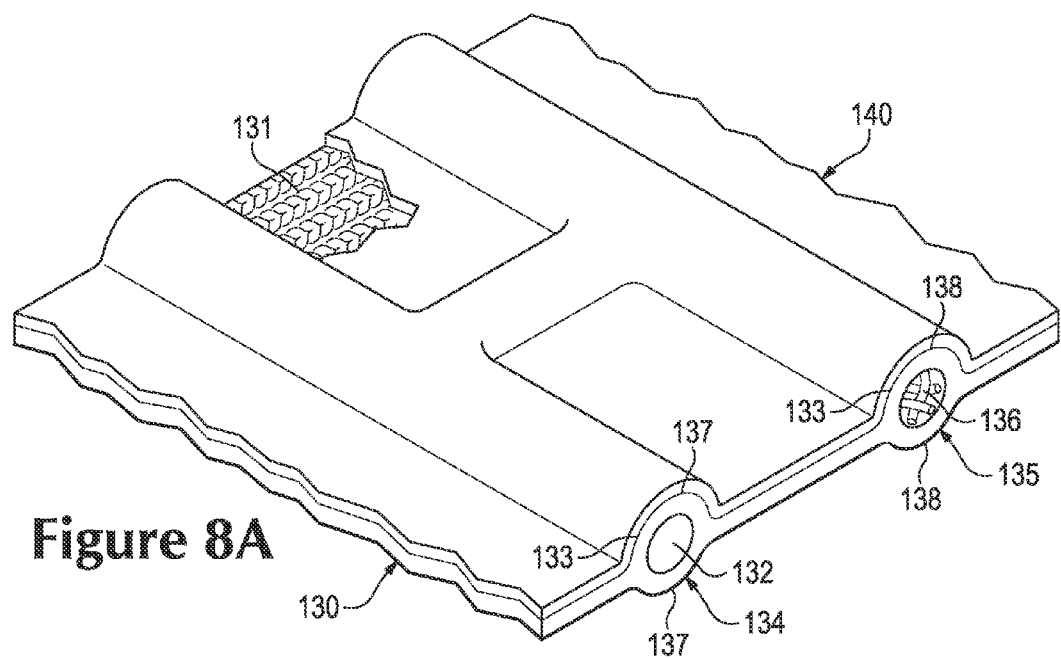
FIGS. 8A and 8B are perspective views of an exemplary portion of the knitted component and the skin layer.
Figure 8B:
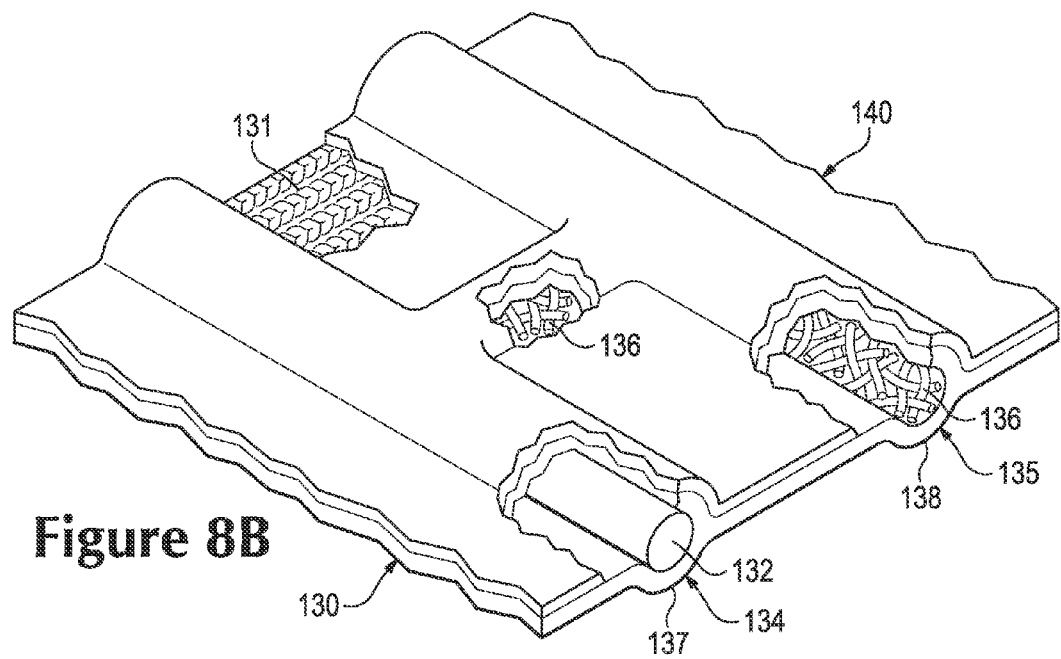

Protruding areas 133 may be formed to have various configurations. That is, multiple knit structures and knitting techniques may be utilized to form protruding areas 133. As examples, each of FIGS. 8A and 8B depict an exemplary portion of upper 120 with two different configurations for protruding areas 133. More particularly, a first of protruding areas 133 includes a first tubular structure 134 and a portion of inlaid strand 132, and a second of protruding areas 133 includes a second tubular structure 135 and a plurality of yarn sections 136. Each of these configurations will be discussed in more detail below.

First tubular structure 134 is an area of knit element 131 with two separate and spaced textile layers 137. Whereas edge areas of first tubular structure 134 are joined and formed of unitary knit construction, a central area is unjoined and forms a channel in which inlaid strand 132 is located. Although first tubular structure 134 alone is sufficient to form one of protruding areas 133, the presence of inlaid strand 131 provides additional thickness. Inlaid strand 132 extends longitudinally and through first tubular structure 134, thereby extending along a length of first tubular structure 134.

Second tubular structure 135 is an area of knit element 131 with two separate and spaced textile layers 138, thereby having a configuration that is similar to first tubular structure 134. Whereas edge areas of second tubular structure 135 are joined and formed of unitary knit construction, a central area is unjoined and forms a channel in which the plurality of yarn sections 136 are located. Although second tubular structure 135 alone is sufficient to form one of protruding areas 133, the presence of yarn sections 136 provides additional thickness.

Yarn sections 136 extend laterally and across second tubular structure 135, thereby extending across a width of second tubular structure 135 rather than along a longitudinal length of second tubular structure 135. Although the manner in which yarn sections 136 are secured may vary, yarn sections 136 are depicted as crossing each other in FIGS. 7A, 7C, 8A, and 8B and may form tuck stitches on opposite sides of second tubular structure 135. That is, tuck stitches may join yarn sections 136 with opposite sides of second tubular structure 135. As depicted in a broken-away area of FIG. 8B, one of protruding areas 133 (i.e., a horizontal protruding area 133) includes additional yarn sections 136 and extends between and effectively joins tubular structures 134 and 135, thereby extending from first tubular structure 134 to second tubular structure 135. Although yarn sections 136 may cross each other in extending across the width of second tubular structure 135, yarn sections 136 may have various other configurations. As examples, yarn sections 136 may lay in a plane and not cross each other, or yarn sections 136 may extend longitudinally and along a length of second tubular structure 135.

As discussed above, protruding areas 133 form bulges, protrusions, bumps, or other outwardly-extending portions in knitted component 130. As such, protruding areas 133 are portions of knitted component 130 that have greater thickness than other areas of knitted component 130. In this configuration, a majority or a relatively large portion of knitted component 130 has a first thickness and the various protruding areas 133 have a second thickness, with the first thickness being less than the second thickness. Depending upon the knit structures and knitting techniques that are utilized to form knitted component 130, as well as the yarns utilized in knitted component 130, the difference between the first thickness and the second thickness may range from one to ten millimeters or more. In many configurations, the first thickness is less than four millimeters, and the second thickness is at least two millimeters greater than the first thickness.

Figure 2:
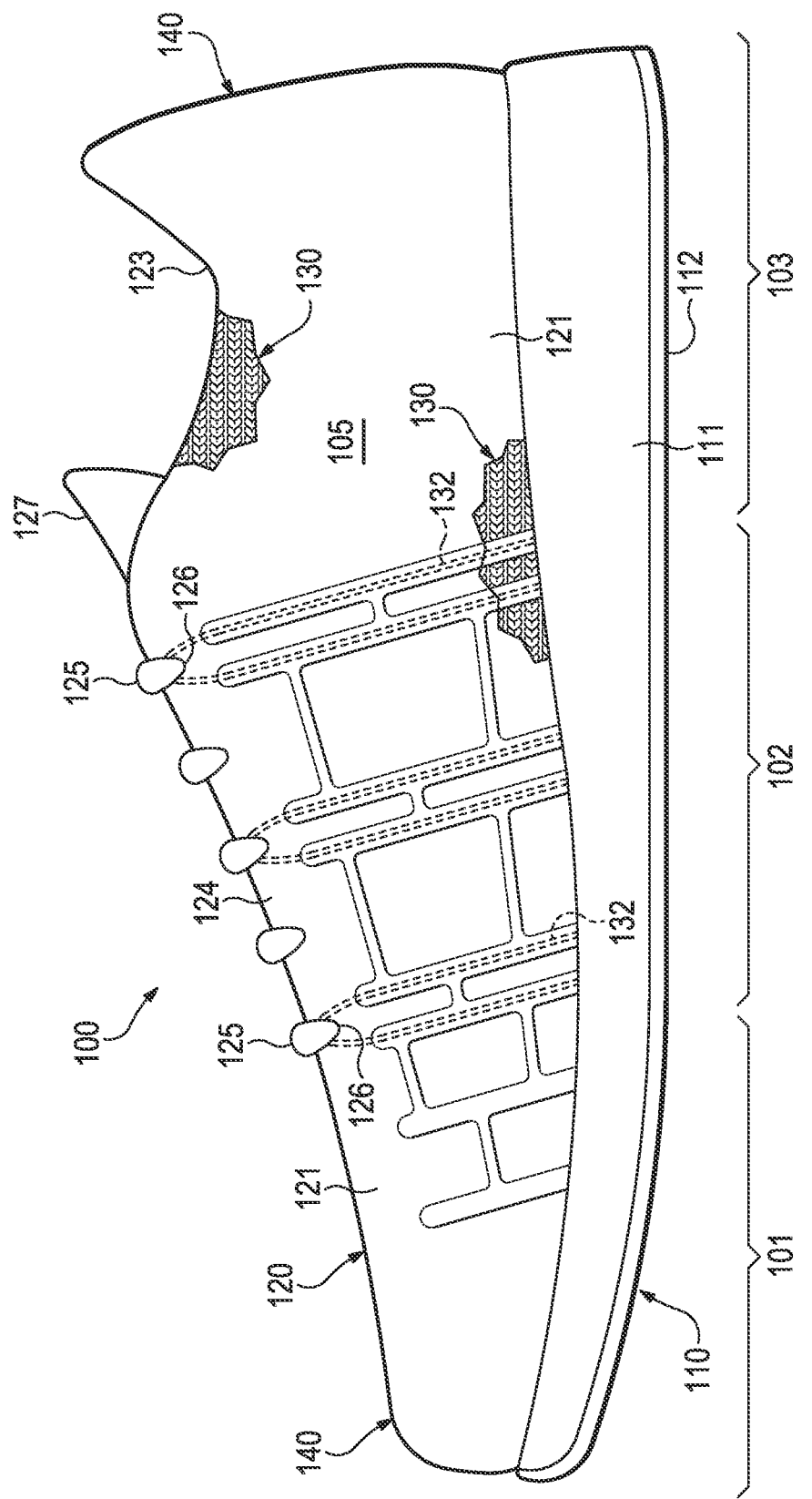
FIG. 2 is a medial side elevational view of the first configuration of the article of footwear.
Figure 9B:
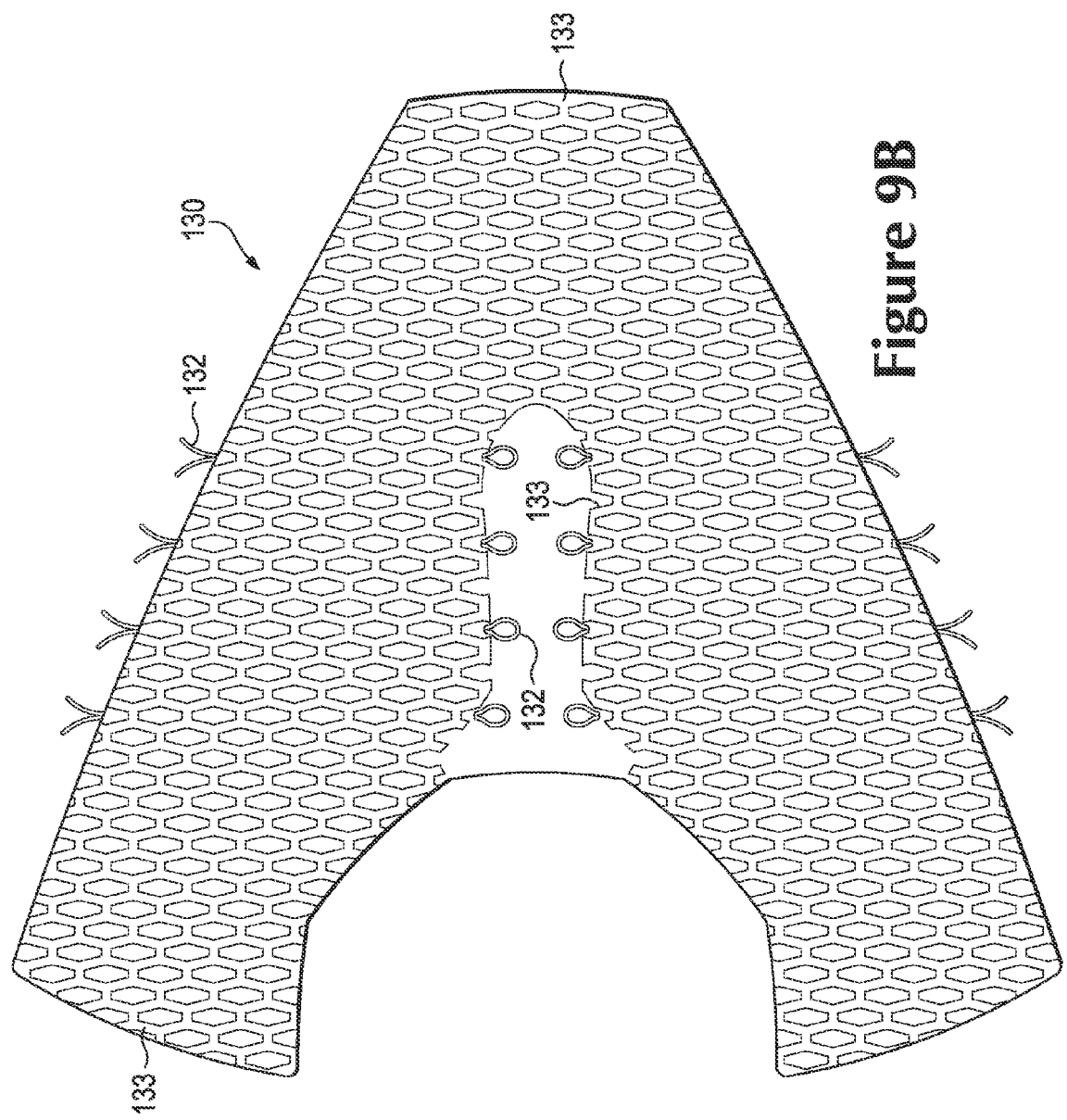

The specific pattern that protruding areas 133 form in upper 120 may vary significantly. Referring to FIGS. 1 and 2, for example, protruding areas 133 extend though a majority of lateral side 104 and medial side 105, but are absent from a forward portion of forefoot region 101 and a rear portion of heel region 103. The locations and configurations of protruding areas 133 may, however vary significantly. As an example, FIG. 9A depicts a configuration wherein the spacing between various protruding areas 133 varies throughout knitted component 130. Moreover, protruding areas 133 that extend between and connect other protruding areas 133 are present in some areas, but absent in other areas. Although protruding areas 133 are present in an area of knitted component 130 that corresponds with forefoot region 101, protruding areas 133 are absent in areas corresponding with heel region 103. In this configuration, knit element 131 extends across a region corresponding with throat area 124, thereby replacing tongue 127. FIG. 9B depicts another configuration wherein protruding areas 133 are present throughout knitted component 130. Another configuration is depicted in FIG. 9C, wherein protruding areas 133 are located to correspond with inlaid strand 132, but are absent in other areas. In addition, in each of the configurations depicted in FIGS. 9A-9C, portions of inlaid strand 132 are exposed to form loops that receive lace 125. Accordingly, various aspects regarding knitted component 130 and protruding areas 133 may vary considerably.

Bonding Process

A variety of processes may be utilized to join knitted component 130 and skin layer 140. In some configurations, skin layer 140 may be formed from a thermoplastic polymer material, which may be welded or thermal bonded to knitted component 130. As discussed above, a thermoplastic polymer material melts when heated and returns to a solid state when cooled sufficiently. Based upon this property of thermoplastic polymer materials, thermal bonding processes may be utilized to form a thermal bond that joins portions of skin layer 140 to knitted component 130. As utilized herein, the term "thermal bonding" or variants thereof is defined as a securing technique between two elements that involves a softening or melting of a thermoplastic polymer material within at least one of the elements such that the materials of the elements are secured to each other when cooled. Similarly, the term "thermal bond" or variants thereof is defined as the bond, link, or structure that joins two elements through a process that involves a softening or melting of a thermoplastic polymer material within at least one of the elements such that the materials of the elements are secured to each other when cooled. As examples, thermal bonding may involve (a) the melting or softening of skin layer 140 such that the thermoplastic polymer material intermingles with materials of knitted component 130 and are secured together when cooled and (b) the melting or softening of skin layer 140 such that the thermoplastic polymer material extends into or infiltrates the structure of knitted component 130 (e.g., extends around or bonds with filaments or fibers in knitted component 130) to secure the elements together when cooled. Additionally, thermal bonding does not generally involve the use of stitching or adhesives, but involves directly bonding elements to each other with heat. In some situations, however, stitching or adhesives may be utilized to supplement the thermal bond or the joining of elements through thermal bonding.

Figure 10A:
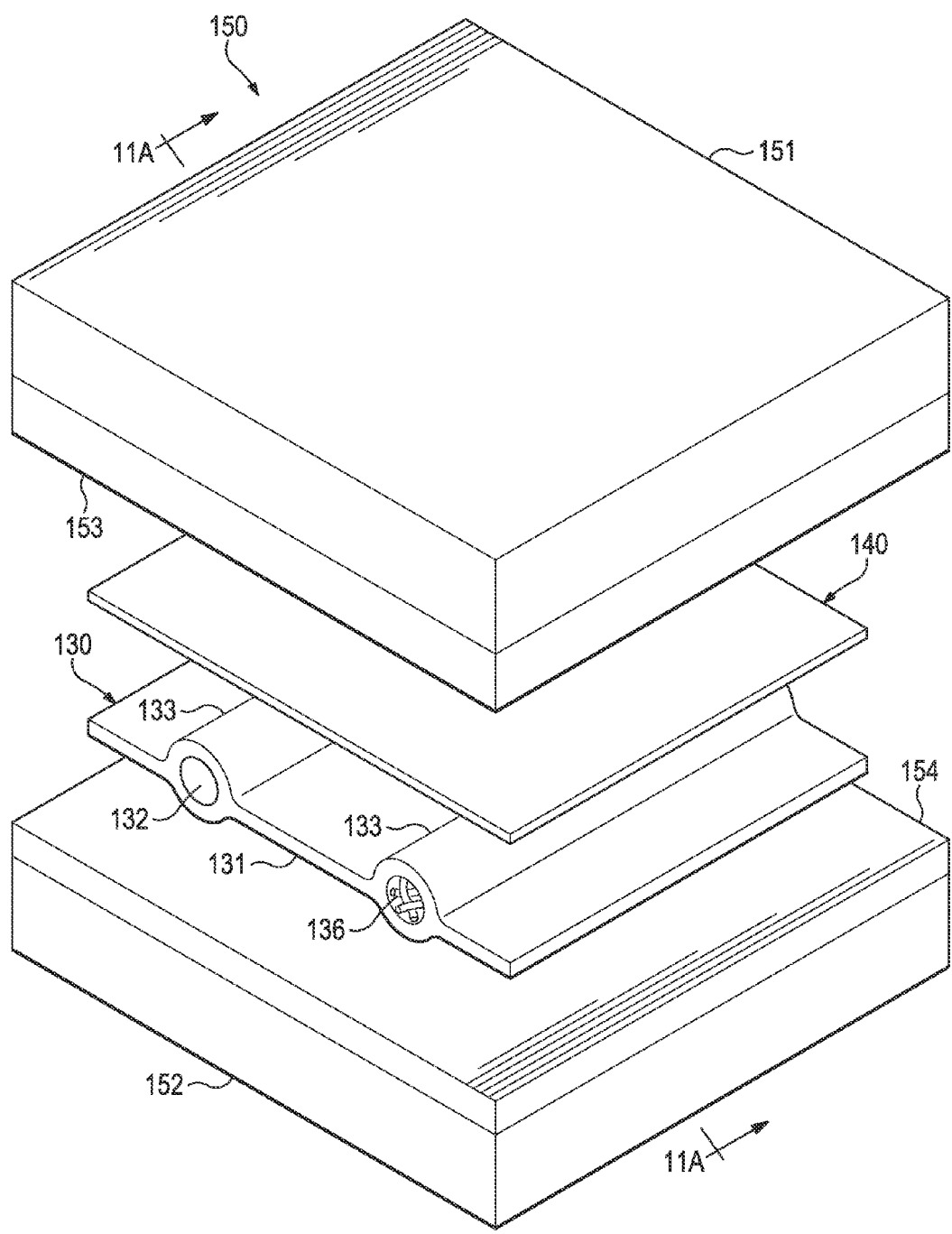
FIGS. 10A-10D are perspective views of a process for utilizing a press to bond the knitted component and the skin layer.
Figure 11A:
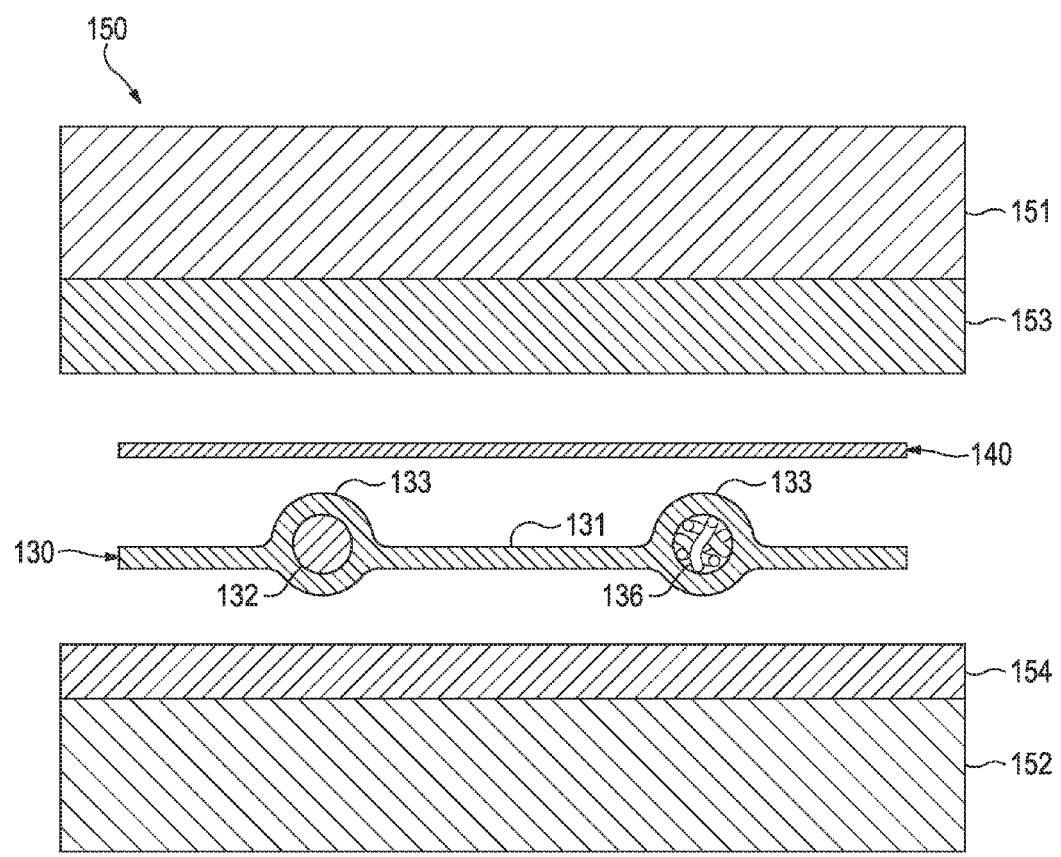
FIGS. 11A-11D are cross-sectional views of the process for utilizing the press, as respectively defined by section lines 11A-11D in FIGS. 10A-10D.

The bonding process utilizes a press 150, which includes a first press portion 151 and a second press portion 152, as depicted in FIGS. 10A and 11A. Each of press portions 151 and 152 have facing surfaces that compress knitted component 130 and skin layer 140 together. The surfaces of press portions 151 and 152 are substantially planar and include materials with different compressibilities. More particularly, first press portion 151 includes a first material 153 and second press portion 152 includes a second material 154. In comparison, first material 153 has greater compressibility than second material 154. As examples of suitable materials, (a) first material 153 may be silicone and second material 154 may be steel, (b) both of materials 153 and 154 may be silicone, with first material 153 having greater thickness than second material 154, or (c) both of materials 153 and 154 may be silicone, with first material 153 having lesser density or hardness than second material 154. A variety of other materials may also be utilized, including various polymers and foams, such as ethylvinylacetate, and rubber. An advantage to silicone, however, relates to compression set. More particularly, silicone may go through numerous compression operations without forming indentations or other surface irregularities.

A process for bonding or otherwise joining knitted component 130 and skin layer 140 will now be discussed. In order to illustrate details associated with the bonding process, the exemplary portions of knitted component 130 and skin layer 140 that are depicted in FIGS. 8A and 8B are utilized in FIGS. 10A-10D and 11A-11D. One skilled in this art will recognize, however, that the concepts discussed herein and depicted in the figures may be applied to the entirety of knitted component 130 and skin layer 140. Referring again to FIGS. 10A and 11A, skin layer 140 is positioned adjacent to knitted component 130 and in an overlapping configuration. Whereas skin layer 140 is positioned adjacent to first press portion 151, knitted component 130 is positioned adjacent to second press portion 152. More particularly, skin layer 140 is positioned to contact first material 153 (i.e., the more compressible material), and knitted component 130 is positioned to contact second material 154 (i.e., the less compressible material). In order to properly position knitted component 130 and skin layer 140, one or both of (a) a jig that holds the components relative to each other and (b) a shuttle frame or other device that moves the components may be utilized. Additionally, a jig or other device may assist with ensuring that knitted component 130 retains a proper shape and remains in a generally planar configuration during the bonding process.

Press 150 is utilized to compress knitted component 130 and skin layer 140 together. In order to join knitted component 130 and skin layer 140, however, one or both of knitted component 130 and skin layer 140 are heated to a temperature that facilitates bonding. Various radiant heaters or other devices may be utilized to heat knitted component 130 and skin layer 140 prior to placement between press portions 151 and 152. In some manufacturing processes, however, press 150 may be heated such that contact between press 150 and knitted component 130 and skin layer 140 raises the temperature of the components to a level that facilitates bonding. Accordingly, the point at which one or both of knitted component 130 and skin layer 140 are heated during this process may vary.

Figure 10B:
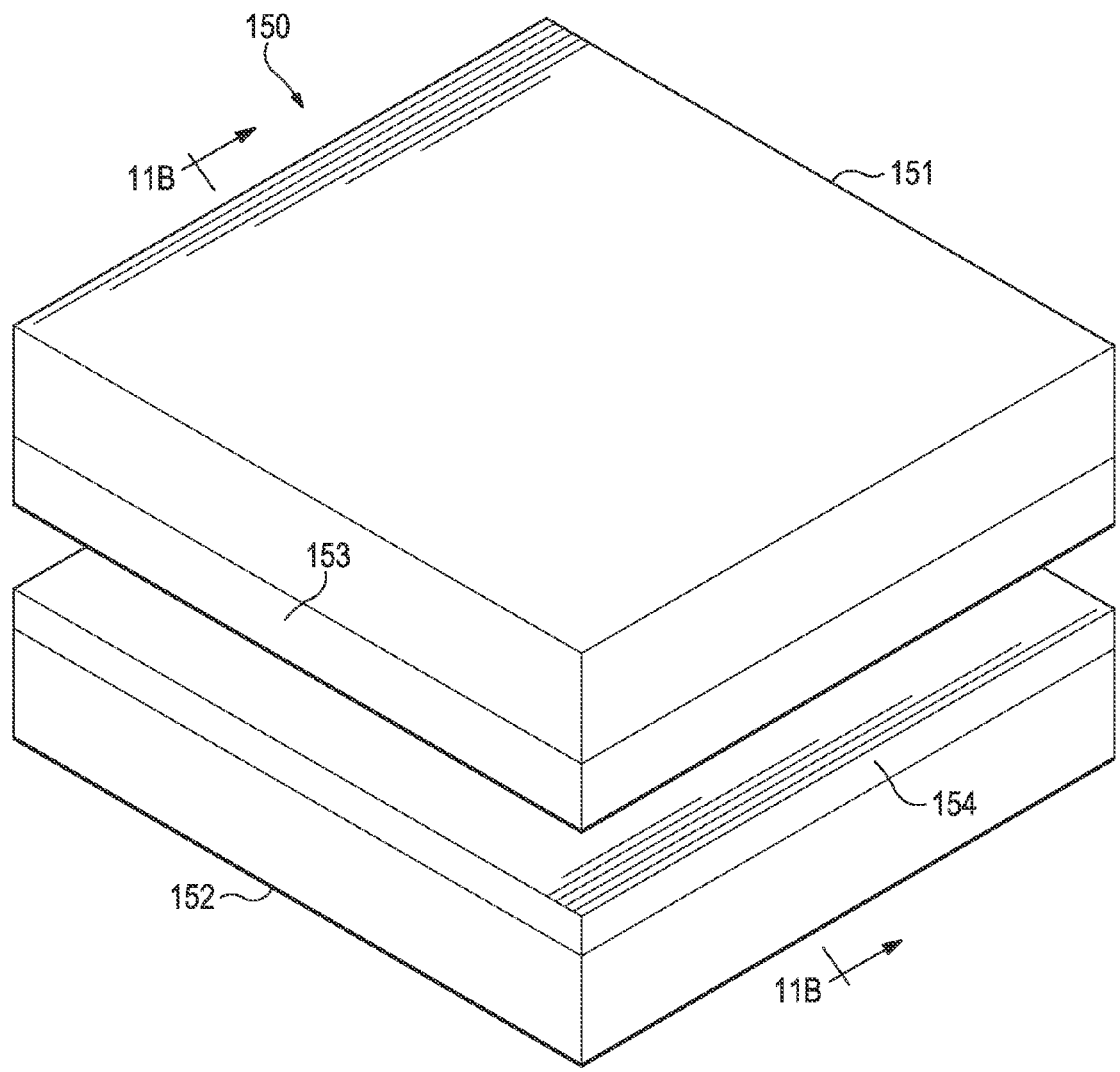
Figure 10C:
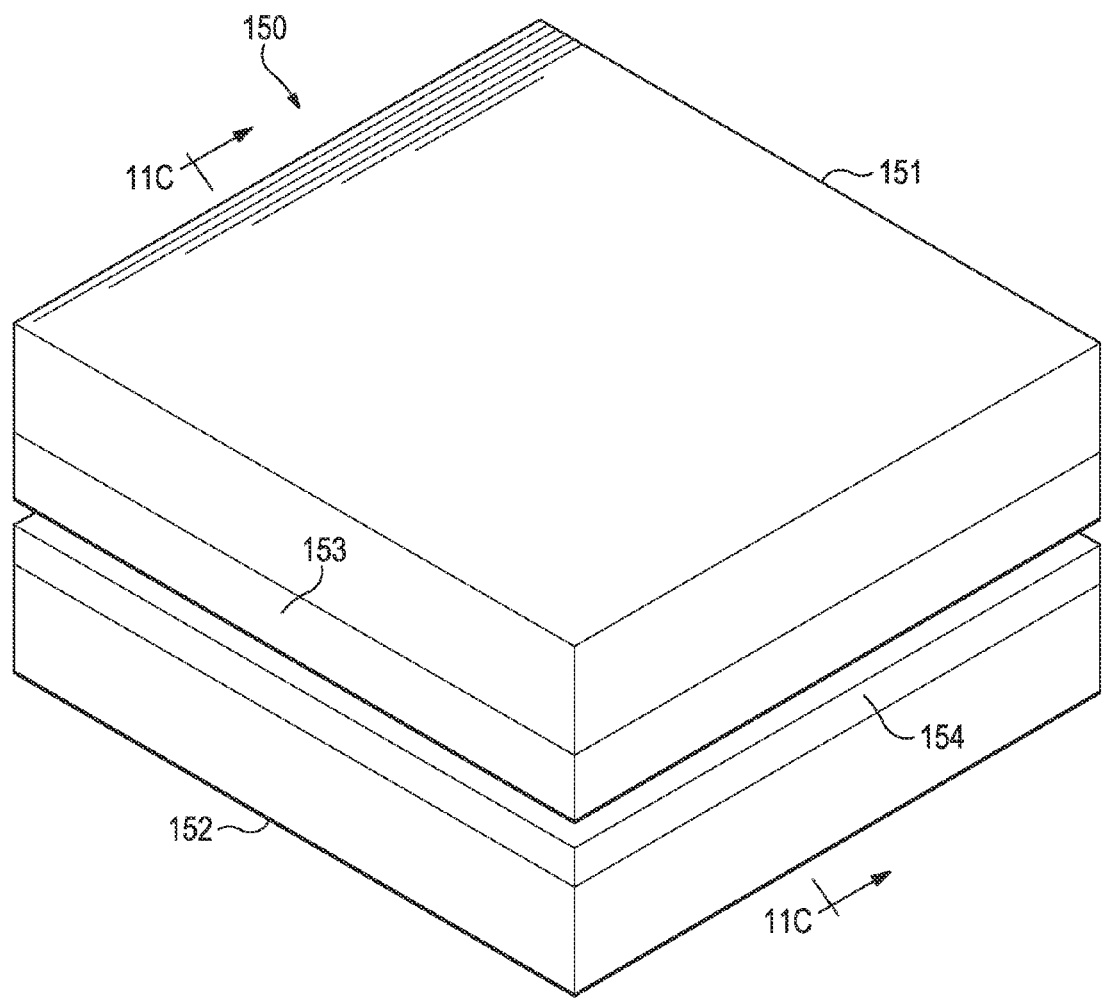
Figure 11B:
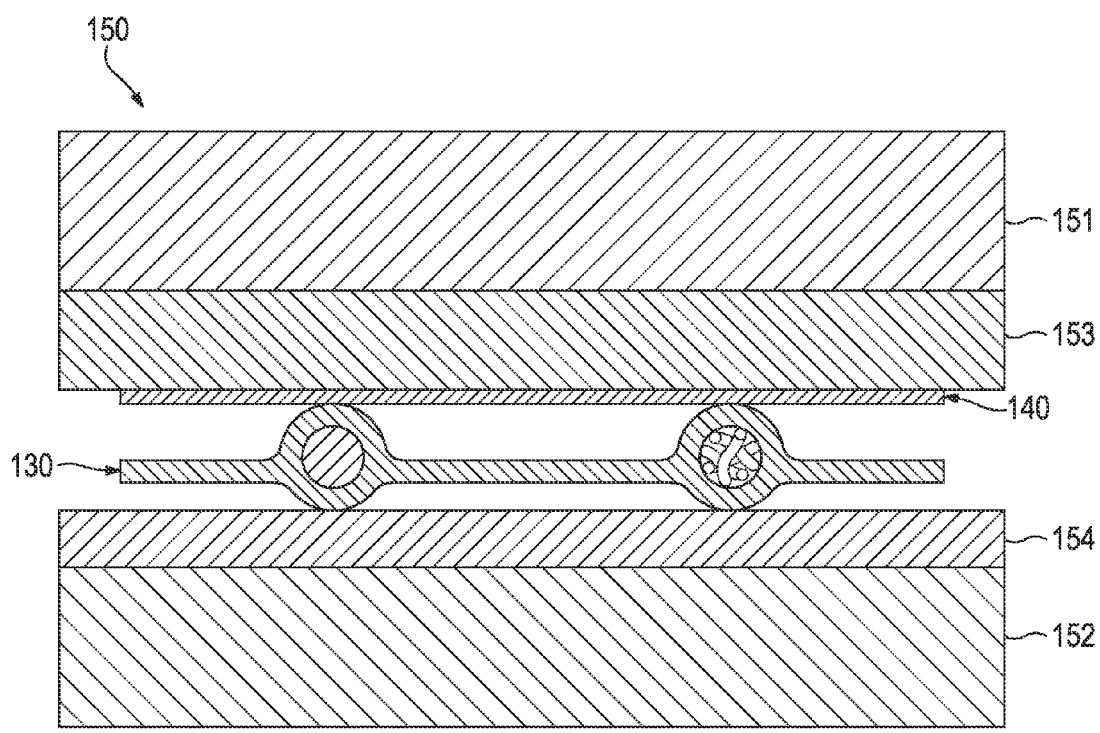
Figure 11C:
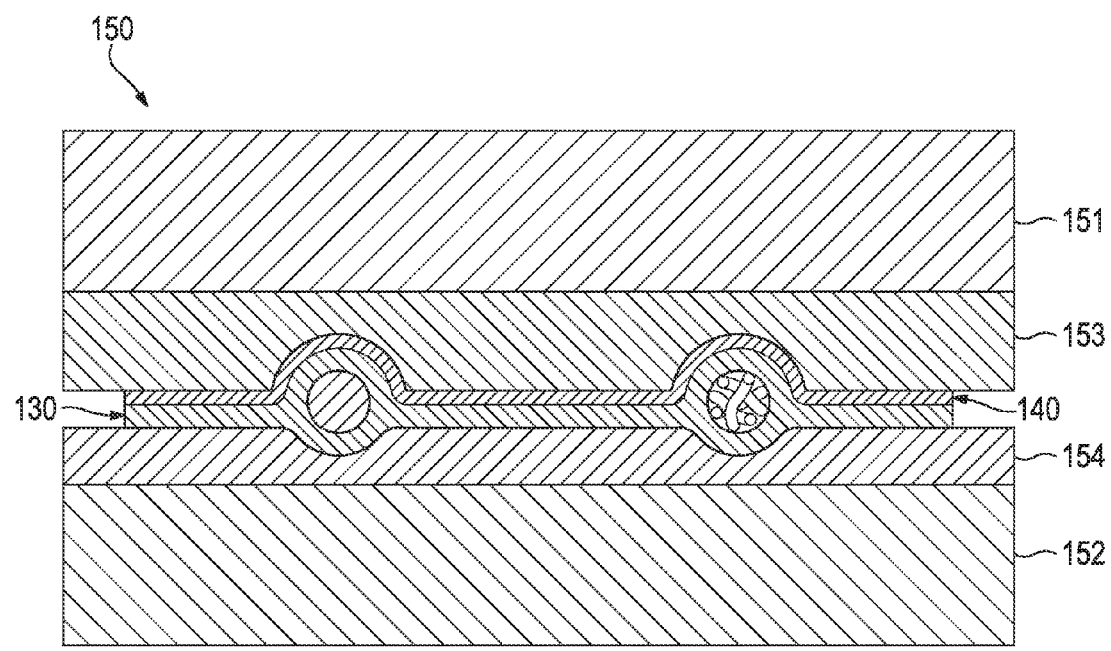

Once knitted component 130 and skin layer 140 are positioned, press portions 151 and 152 translate toward each other and begin to close upon the components such that (a) the surface of first press portion 151 having first material 153 begins to contact skin layer 140 and (b) the surface of second press portion 152 having second material 154 begins to contact knitted component 130, as depicted in FIGS. 10B and 11B. Press portions 151 and 152 then translate further toward each other to fully compress the components, as depicted in FIGS. 10C and 11C. At this stage, skin layer 140 is effectively bonded or otherwise joined to knitted component 130. More particularly, the compressive force of press 150, coupled with the elevated temperature of the compressed components, forms a thermal bond that joins knitted component 130 and skin layer 140.

Figure 10D:
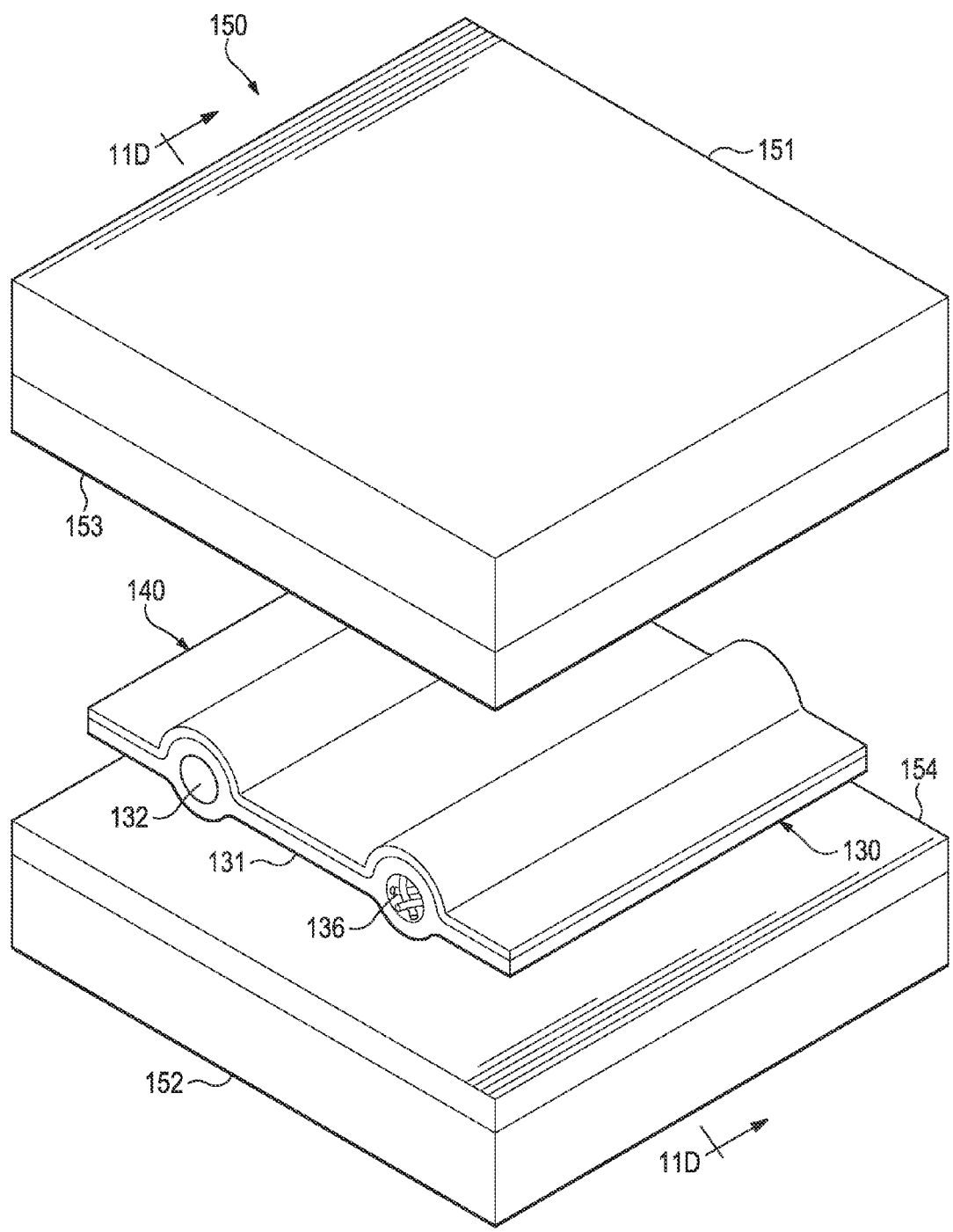
Figure 11D:
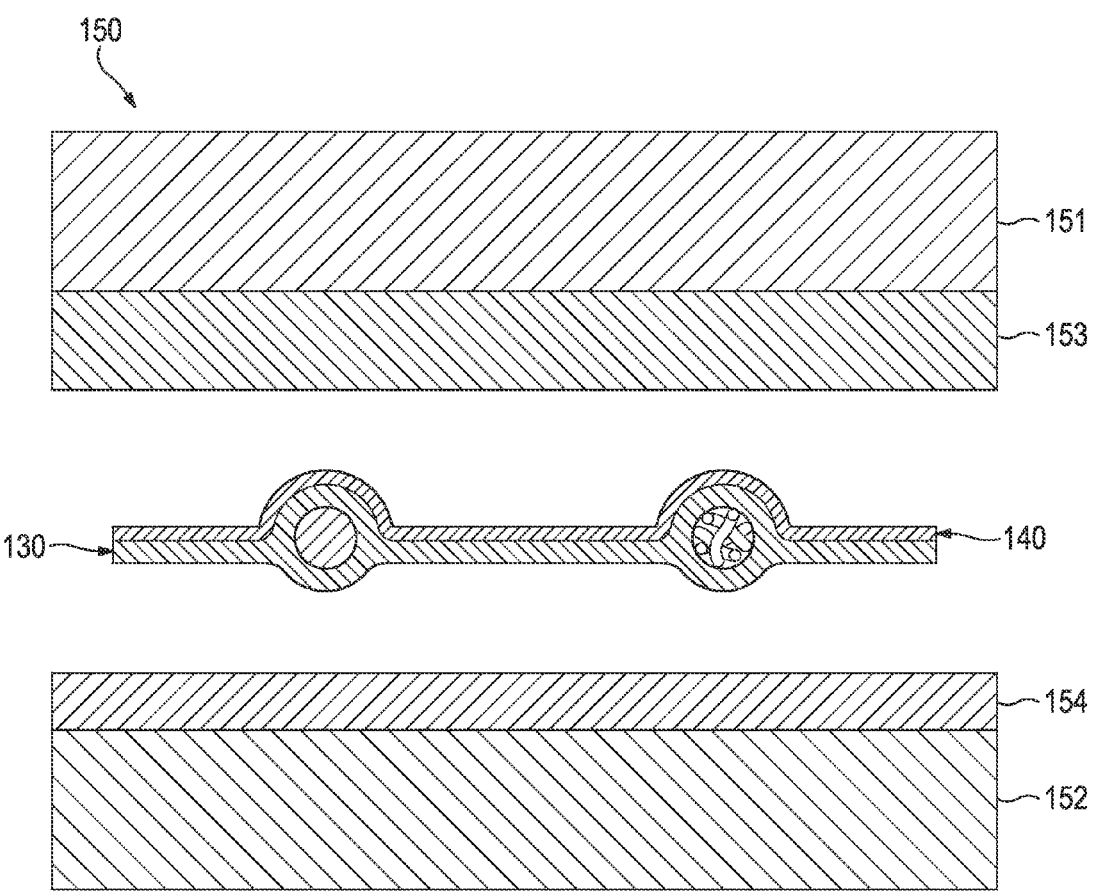

As noted above, first material 153 compresses more easily than second material 154. Referring to FIGS. 10C and 11C, areas of skin layer 140 that are adjacent to protruding areas 133 press into first material 153, whereas second material 154 remains more planar, but compresses to a lesser degree. Due to the different compressibilities between materials 153 and 154, first material 153 compresses at the locations of protruding areas 133. Moreover, (a) portions of skin layer 140 that are in contact protruding areas 133 of knitted component 130 protrude into the surface formed by first material 153 to a first depth and (b) portions of skin layer 140 that are in contact with other regions of knitted component 130 (i.e., regions with lesser thickness) protrude into the surface formed by first material 153 to a second depth, the first depth being greater than the second depth. When bonding is complete, press 150 is opened and the bonded components are removed and permitted to cool, as depicted in FIGS. 10D and 11D. As a final step in the process, the combination of knit component 130 and skin layer 140 may be incorporated into upper 120 of footwear 100.

The relative hardnesses, densities, and thicknesses between materials 153 and 154 may vary considerably to provide different compressibilities between the surfaces of press 150. By varying the hardnesses, densities, and thicknesses, the compressibilities of the surfaces may be tailored to specific pressing operations or configurations. While hardness, density, and thickness may each be considered, some configurations of press 150 may have materials 153 and 154 with only different hardnesses, only different densities, or only different thicknesses. Additionally, some configurations of press 150 may have materials 153 and 154 with (a) the same hardnesses and densities, but different thicknesses, (b) the same hardnesses and thicknesses, but different densities, or (c) the same densities and thicknesses, but different hardnesses. Accordingly, the various properties of materials 153 and 154 may be modified in various ways to achieve different relative compressibilities between the surfaces of press 150.

Each of materials 153 and 154 are depicted as having a substantially planar surface. Depending upon the configuration of knitted component 130 and the various protruding areas 133, however, the surfaces of materials 153 and 154 may also be contoured. For example, first material 153 may include various depressions or indentations that correspond with the positions of protruding areas 133, thereby enhancing the degree to which skin layer 140 wraps around protruding areas 133.

Press 150 provides one example of a device that may be utilized to bond knitted component 130 and skin layer 140. As another example, one of press portions 151 and 152 may be replaced with a flexible membrane and a pump may be utilized to evacuate air from between the membrane and second press portion 152. As the air is evacuated, the membrane will press upon skin layer 140 and induce bonding. As another example, a dual membrane system may be utilized to compress knitted component 130 and skin layer 140 together.

An advantage of selecting materials 153 and 154 to have different compressibilities relates to the three-dimensional aspect of upper 120 that protruding areas 133 provide. More particularly, the different compressibilities ensures that protruding areas 133 continue to form bulges, protrusions, bumps, or other outwardly-extending portions when knitted component 130 and skin layer 140 are compressed and bonded. In the absence of compressible materials, the degree to which upper 120 includes outwardly-extending portions at protruding areas 133 may be lessened.

Ankle Cuff Configuration

Figure 12:
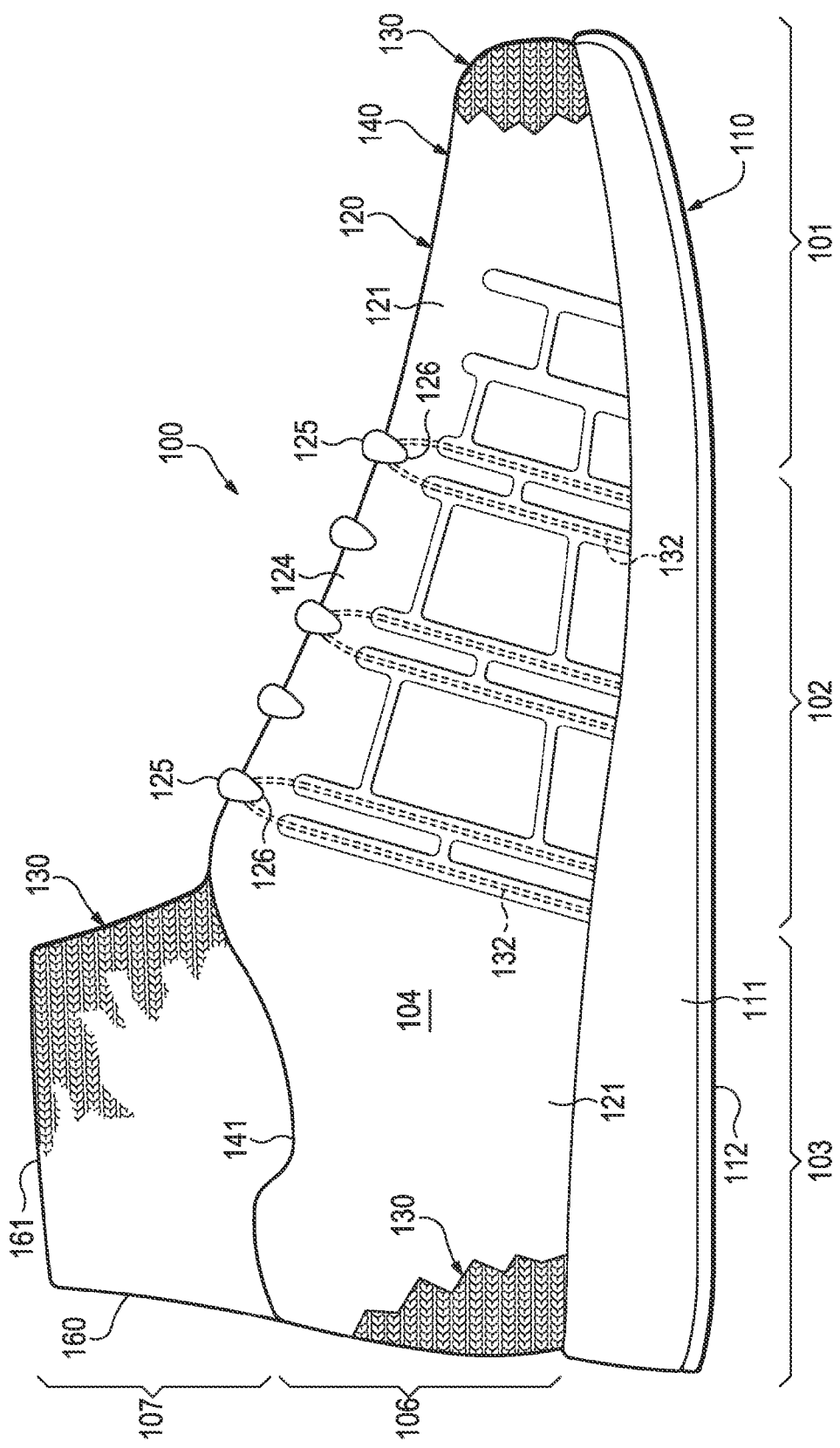
FIG. 12 is a lateral side elevational view of a second configuration of the article of footwear.
Figure 13:
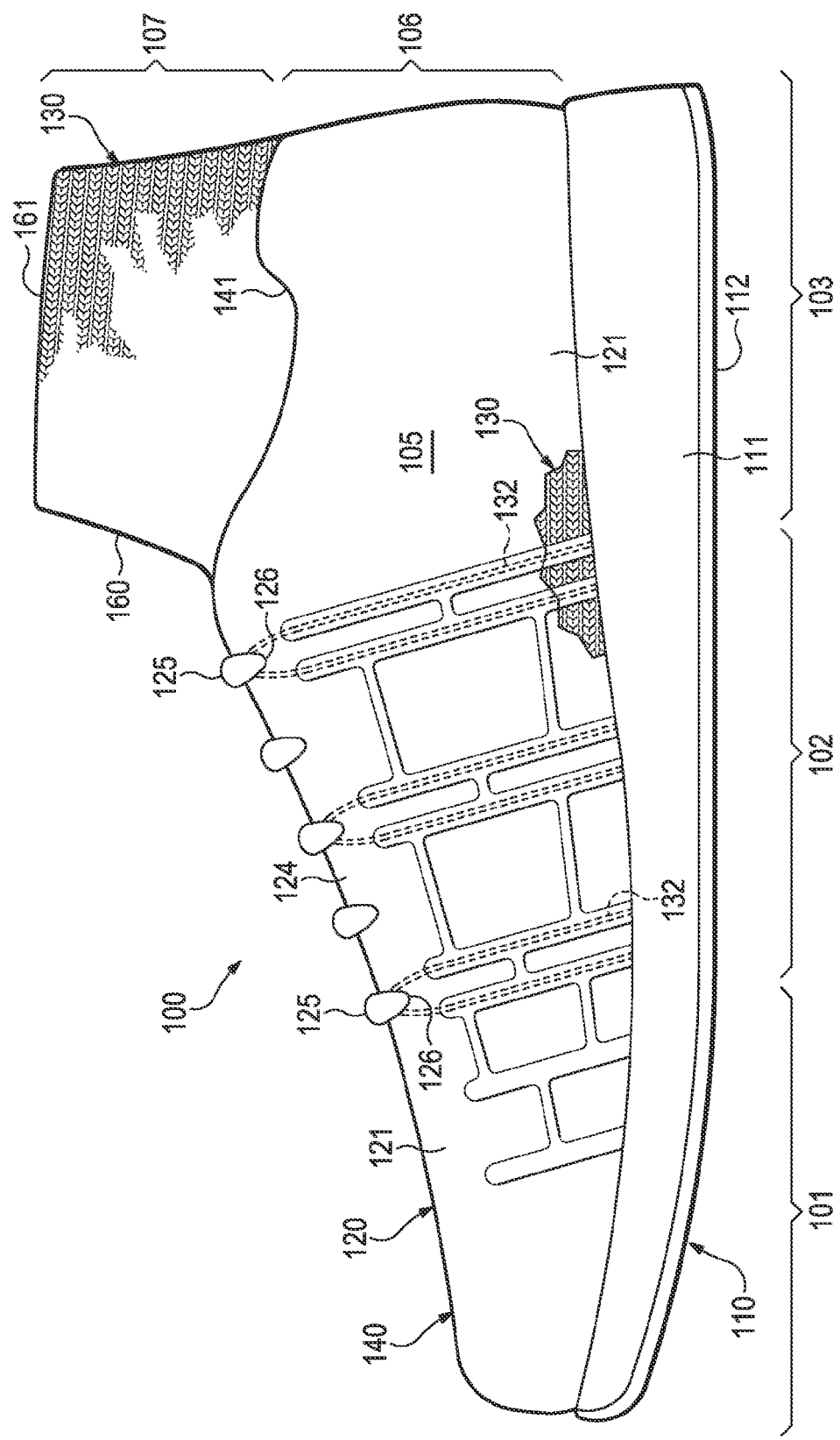
FIG. 13 is a medial side elevational view of the second configuration of the article of footwear.
Figure 14:
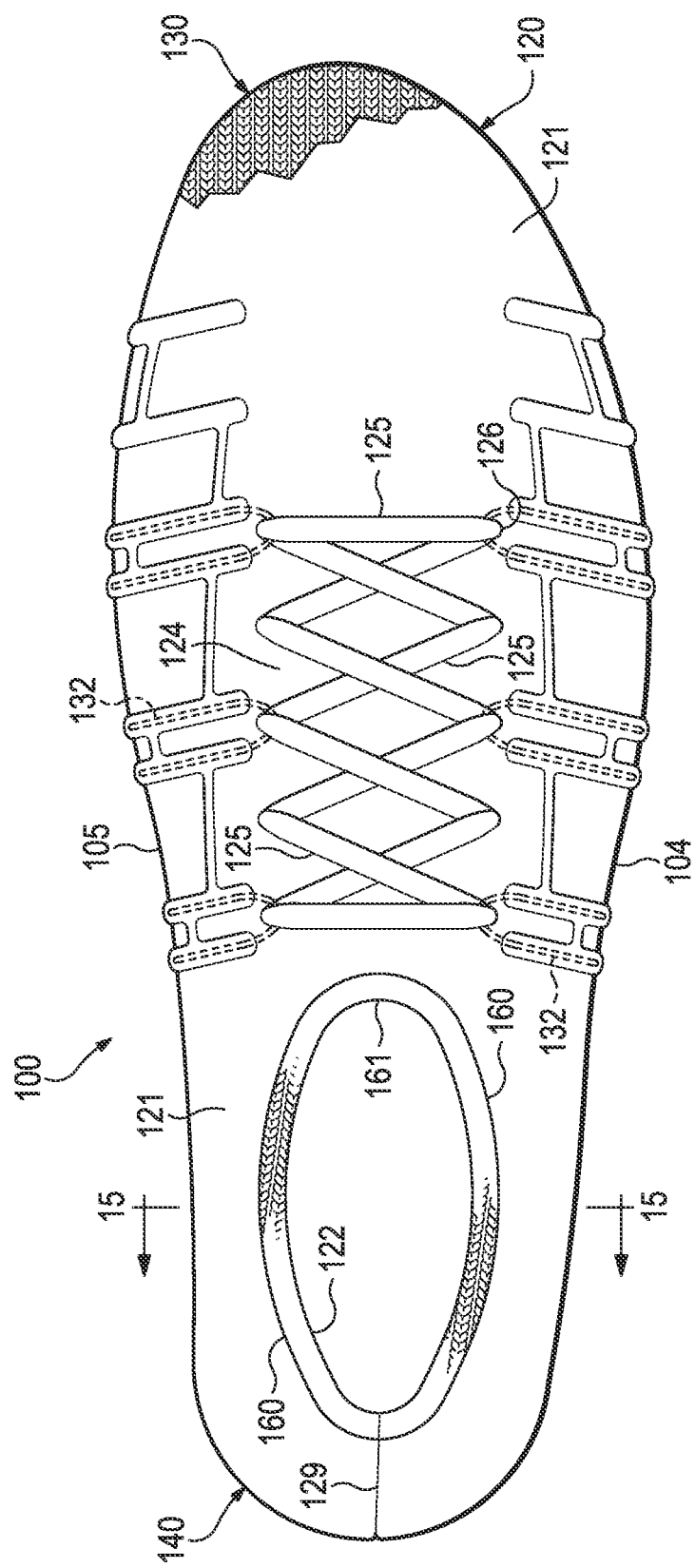
FIG. 14 is a top plan view of the second configuration of the article of footwear.
Figure 15:
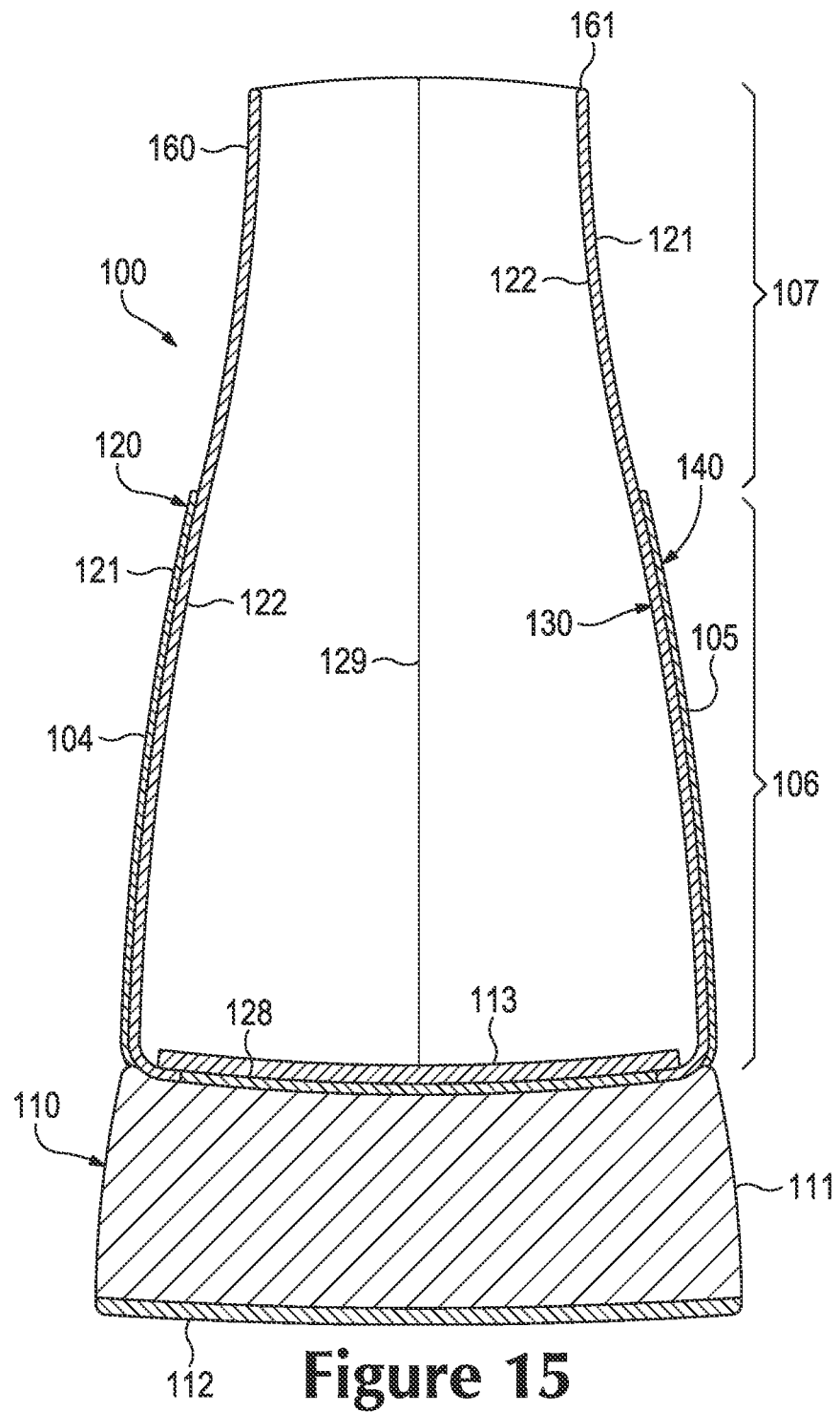
FIG. 15 is a cross-sectional view of the second configuration of the article of footwear, as defined by section line 15 in FIG. 14.

Another configuration of footwear 100 is depicted in FIGS. 12-15 as including an ankle cuff 160 for covering at least a portion of an ankle of the wearer. In addition to covering the foot, therefore, upper 120 extends upward and covers a portion of the ankle. For reference purposes, upper 120 may be divided into two general regions: a foot region 106 and an ankle region 107, as shown in FIGS. 12, 13, and 15. Foot region 106 extends through each of regions 101-103 and generally encompasses portions of upper 120 corresponding with the foot. In many configurations of footwear 100, foot region 106 corresponds with portions of upper 120 that are intended to be below the lateral malleolus and the medial malleolus (i.e., the bony prominences on each side of the ankle) of the wearer. Ankle region 107 is primarily located in heel region 103 and generally encompasses portions of upper 120 corresponding with the ankle. In many configurations of footwear 100, ankle region 107 corresponds with portions of upper 120 that are intended to cover and extend above the lateral malleolus and the medial malleolus.

Ankle cuff 160 is located in ankle region 107 and forms an ankle part of knitted component 130. A remainder of knitted component 130, which is located in foot region 106, forms a foot part of knitted component 130. Whereas the foot part of knitted component 130 covers the foot of the wearer, the ankle part of knitted component 130, which includes ankle cuff 160, covers the ankle of the wearer when footwear 100 is worn. Moreover, ankle cuff 160 and the ankle part of knitted component 130 may be formed of unitary knit construction with the foot part of knitted component 130.

Although seam 129 may be present in ankle cuff 160, the ankle part of knitted component 130 has a continuous structure for extending entirely around the ankle of the wearer. Referring to the top plan view of FIG. 14, ankle cuff 160 forms a circular, oval, or otherwise continuous and rounded opening 161 that provides access to the void within upper 120. Opening 161 may have relatively large dimensions that allow the foot to pass through and into the void. In many configurations of footwear 100, however, opening 161 stretches to accommodate the foot. Moreover, ankle cuff 160 may have dimensions that are less than an average ankle, and ankle cuff may remain somewhat stretched and lay firmly against the ankle once the foot is located within the void.

Accordingly, ankle cuff 160 and other portions of knitted component 130 in ankle region 107 may be formed to have stretch properties.

When knitted component 130 is incorporated into footwear 100, inlaid strand 132 extends in a generally vertical direction and from throat area 124 to an area where sole structure 110 is secured to upper 120. More particularly, inlaid strand repeatedly passes through knit element 131 from throat area 124 to an area adjacent to sole structure 110. In throat area 124, inlaid strand may also extend around lace-receiving elements 126, there by forming loops through which lace 125 passes. In comparison with knit element 131, inlaid strand 132 may exhibit greater stretch-resistance. That is, inlaid strand 132 may stretch less than knit element 131. Given that numerous sections of inlaid strand 132 extend toward sole structure 110 from throat area 124, inlaid strand 132 imparts stretch-resistance to this area of upper 120. Moreover, placing tension upon lace 125 may impart tension to inlaid strand 132, thereby inducing the portion of upper 120 between throat area 124 and sole structure 110 to lay against the foot. As such, inlaid strand 132 operates in connection with lace 125 to assist with securing upper 120 around the foot and enhance the fit of footwear 100.

In order to enhance the stretch properties of ankle cuff 160, skin layer 140 may be absent from ankle region 107. That is, skin layer 140 may be absent from the ankle part of knitted component 130. In this configuration, the ankle part of knitted component 130, including ankle cuff 160, forms a portion of exterior surface 121 and interior surface 122 in ankle region 107. As such, skin layer 140 and the portions knitted component 130 that form ankle cuff 160 form a majority of exterior surface 121, and knitted component 130 alone may form a relatively large portion of interior surface 122.

In the area of ankle cuff 160, skin layer 140 forms a concave edge 141 that extends downward on each of sides 104 and 105. More particularly, skin layer 140 may be absent from areas of knitted component 130 that cover the lateral malleolus and the medial malleolus. An advantage of this configuration is that ankle cuff 160 may stretch over the lateral malleolus and the medial malleolus, thereby enhancing the comfort of footwear 100. In other configurations, skin layer 140 may extend upward to cover the lateral malleolus and the medial malleolus, or edge 141 may be relatively straight or convex in the area of ankle cuff 160.

Based upon the above discussion, ankle cuff 160 may exhibit greater stretch than other portions of upper 120. In addition to allowing the foot to enter footwear 100, this structure provides support for the foot and limits movement of the foot relative to sole structure 120. In addition, ankle cuff 160 may remain in a stretched state and lay against the ankle when footwear 100 is worn, which imparts two advantages: First, ankle cuff 160 prevents or limits dirt, dust, and other debris from entering footwear 100. Second, the wearer may sense the presence of ankle cuff 160 around the ankle, which enhances the wearer's proprioceptive awareness of the foot.

Lace Channel Configuration

Figure 16:
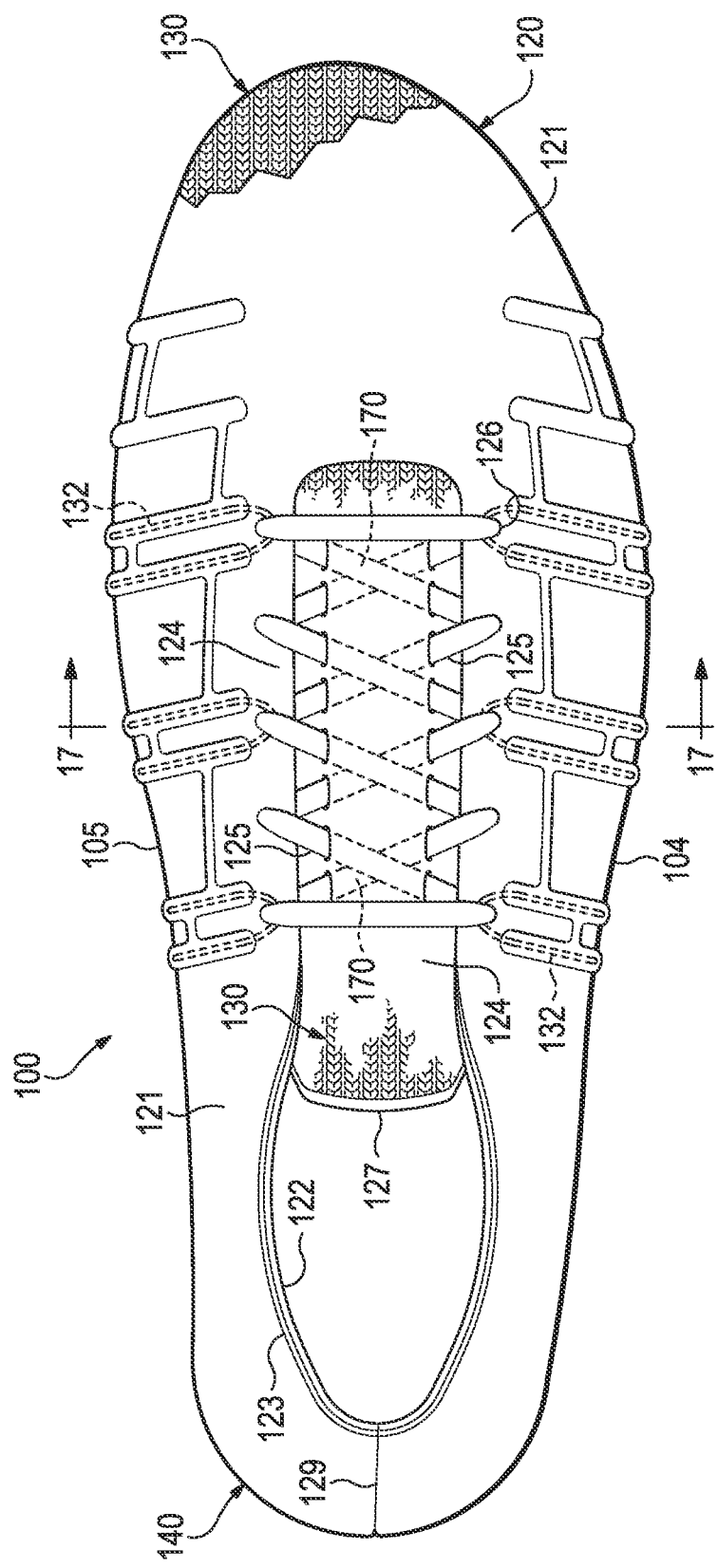
FIG. 16 is a top plan view of a third configuration of the article of footwear.
Figure 17:
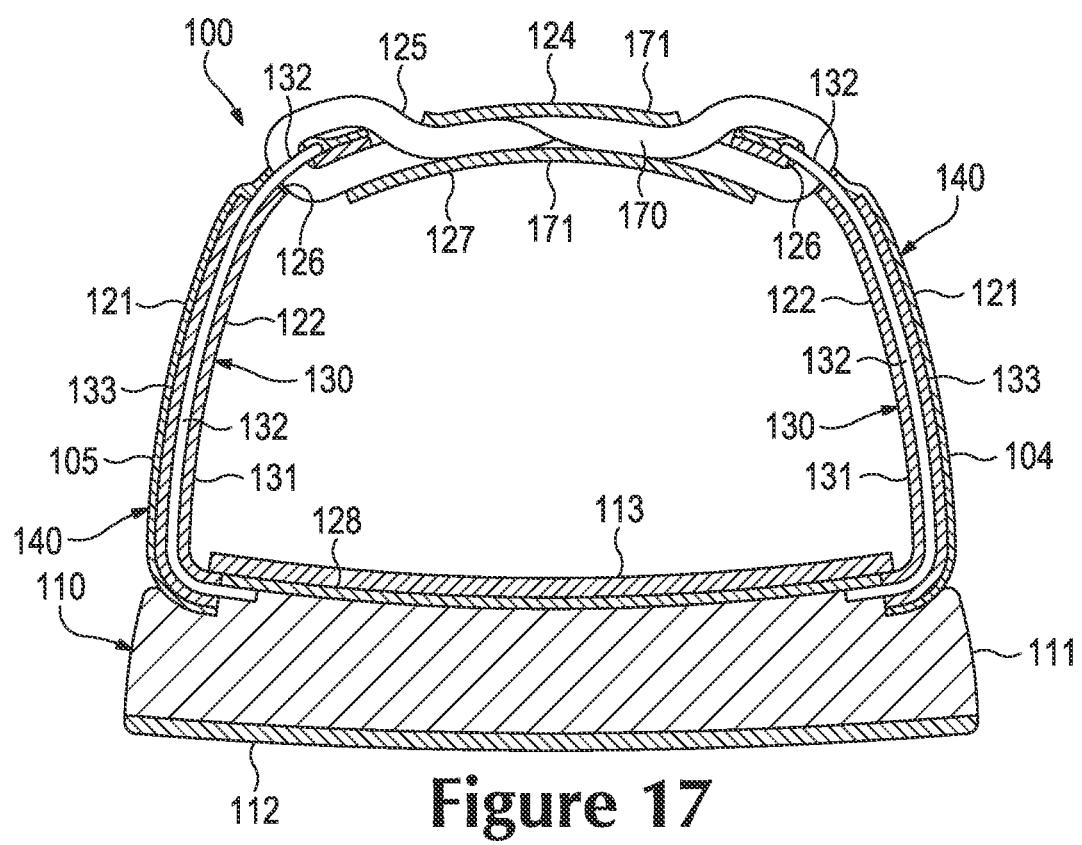
FIG. 17 is a cross-sectional view of the third configuration of the article of footwear, as defined by section line 17 in FIG. 16.
Figure 18:
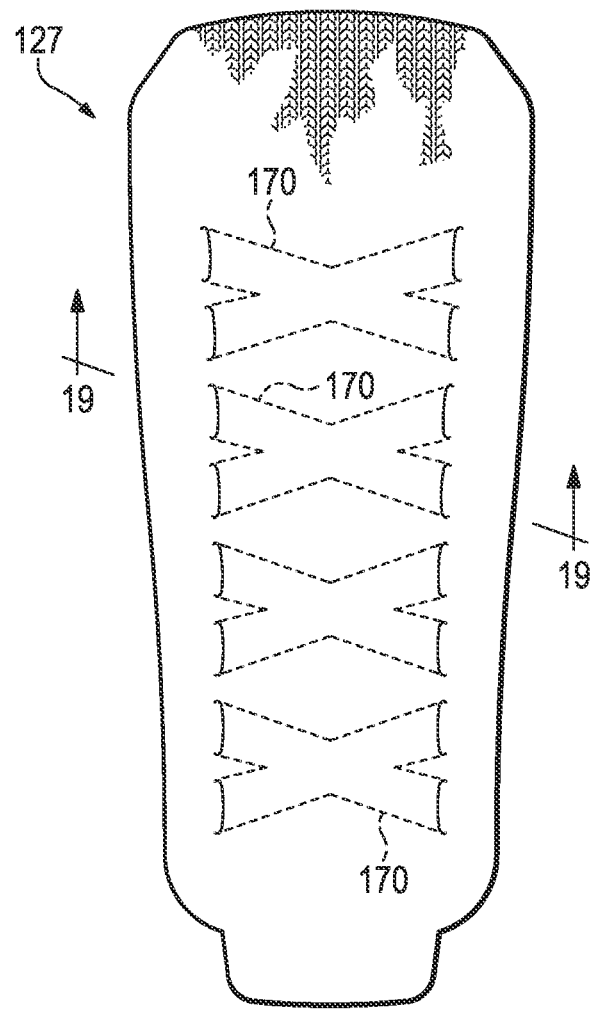
FIG. 18 is a top plan view of a tongue from the third configuration of the article of footwear.
Figure 19:
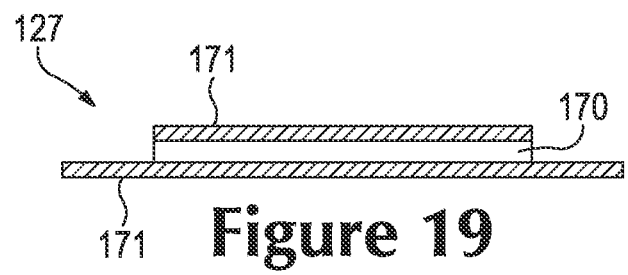
FIG. 19 is a cross-sectional view of the tongue, as defined by section line 19 in FIG. 18.

A further configuration of footwear 100 is depicted in FIGS. 16 and 17 as including various lace channels 170 in tongue 127. Lace 125 passes through lace channels 170, thereby locating portions of lace 125 within tongue 127. Referring to FIGS. 18 and 19, which depict tongue 127 separate from a remainder of footwear 100, each of lace channels 170 are oriented diagonally with respect to a longitudinal axis of footwear 100. The locations of lace channels 170 generally correspond with the locations of lace-receiving elements 126 and follow the natural path of lace 125 as it passes between lace-receiving elements 126. That is, the positions and orientations of lace channels 170 are selected such that two of lace-receiving elements 126 are located adjacent to opposite ends of each lace channel 170. In effect, therefore, lace channels 170 are located along a line that extends between two lace-receiving elements 126. Moreover, lace 125 extends through the various lace channels 170 and engages lace-receiving elements 126 that are located on opposite sides of lace channels 170. As such, lace 125 follows a zigzagging path between lace-receiving elements 126.

Lace channels 170 have a structure that is similar to tubular structures 134 and 135. As such, lace channels 170 include two separate and spaced textile layers 171 that overlap each other. Whereas edge areas of lace channels 170 are joined and formed of unitary knit construction, a central area is unjoined and forms a tubular structure in which lace 125 is located. That is, lace 125 extends longitudinally and through each lace channel 170, thereby extending along a length of each lace channel 170.

Although various methods may be utilized to form tongue 127, a knitting process (e.g., flat knitting process) may be utilized. In configurations where a similar knitting process is utilized for tongue 127 and knitted component 130, each of tongue 127 and knitted component 130 may have similar properties, materials, and aesthetics. Additionally, an advantage of the knitting process is that lace channels 170 may be formed of unitary knit construction with a remainder of tongue 127, which provides efficient manufacture and imparts a smooth and seamless configuration to tongue 127.

A configuration of knitted component 130 in combination with lace 125 is depicted in FIG. 20. As with the configurations in FIGS. 9A-9C, knit element 131 extends across a region corresponding with throat area 124, thereby replacing tongue 127. Moreover, knit element 131 forms the various lace channels 170. As with the various lace channels 170 in tongue 127, lace channels 170 in this configuration are two separate and spaced textile layers that overlap each other, are formed of unitary knit construction, and receive lace 125.

Lace 125 is depicted as extending through lace channels 170 in FIG. 20. In place of apertures that form lace-receiving elements 126, inlaid strand 132 is exposed and forms loops for receiving lace 125. That is, the loops formed by inlaid strand 132 are lace-receiving elements 126, which are located on opposite sides of throat area 124. Lace 125 extends through (a) the loops formed by inlaid strand 132 and (b) the various lace channels 170. As with tongue 127, each of lace channels 170 are oriented diagonally with respect to a longitudinal axis and follow the natural path of lace 125. That is, the positions and orientations of lace channels 170 are selected such that two loops are located adjacent to opposite ends of each lace channel 170. As such, lace 125 follows a zigzagging path between the loops formed by inlaid strand 132.

Lace channels 170 may have various lengths. In FIG. 16, ends of lace channels 170 are positioned adjacent to an edge of knitted component 130 in throat area 124. Although knitted component 130 overlaps portions of tongue 127, ends of lace channels 170 are exposed and receive lace 125. In FIG. 20, ends of lace channels 170 are positioned adjacent to the loops that form lace-receiving elements 126. In either configuration, one or more of lace channels 170 may have a length greater than three centimeters. In other configurations, however, lace channels 170 may range from one to more than ten centimeters.

A further configuration of knitted component 130 is depicted in FIGS. 21 and 22 as defining various apertures 172 between loops formed by inlaid strand 132 and in the region corresponding with throat area 124. Apertures 172 form openings that extend through knit element 131. In this configuration, lace 125 extends through the various apertures 172, and portions of lace 125 are located adjacent to an opposite side of knit element 131. More particularly, lace 125 passes through the loops formed by inlaid strand 132 and enters apertures 172, thereby positioning portions of lace 125 that are between the loops adjacent to the opposite side of knit element 131. The locations of apertures 172 generally correspond with the locations of the loops formed by inlaid strand 132 and follow the natural path of lace 125. That is, apertures 172 are located along a line that extends between two of the loops formed by inlaid strand 132.

Further Configurations

Various configurations of footwear 100, upper 120, knitted component 130, and skin layer 140 are discussed above. There configurations, however, are intended to provide examples of structures and other features that may be incorporated into footwear 100. Although many variations upon footwear 100, upper 120, knitted component 130, and skin layer 140 are possible, some additional configurations are discussed below.

In many configurations of footwear 100, knitted component 130 forms a majority of interior surface 122. Referring to FIGS. 23 and 24, an interior layer 180 is depicted as being secured to knitted component 130 and forming a portion of interior surface 122. Interior layer 180 may inhibit stretch in upper 120 and may enhance the wear-resistance or abrasion-resistance of upper 120. Interior layer 180 may also impart water-resistance to footwear 100. Additionally, forming footwear 100 to include interior layer 180 may provide uniform fit and conformance to the foot, a relatively seamless interior with enhanced comfort for the wearer, a relatively light weight, and support for the foot. Although interior layer 180 may be utilized in configurations that also include skin layer 140, interior layer 180 may be utilized in the absence of skin layer 140 or as a replacement for skin layer 140.

Interior layer 180 may extend over substantially all of knitted component 130 or may be absent in specific areas of knitted component 130. In areas corresponding with forefoot region 101, for example, interior layer 180 defines a plurality of apertures 181 that may enhance the stretch, flex, and breathability properties of upper 120. By varying the size, position, and number of apertures 181, the properties of upper 120 may also be varied. In areas adjacent to inlaid strand 132, interior layer 180 is formed to define larger apertures and has an articulated structure, which may promote flex in areas corresponding with midfoot region 102, while also providing stability and stretch-resistance. This portion of interior layer 180 may also experience tension and resist stretching when lace 125 is tightened. As such, the combination of interior layer 180 and inlaid strand 132 may impart greater resistance to stretch in upper 120. In areas corresponding with heel region 103, interior layer 180 is located to provide additional stretch-resistance and durability to collar 123. It should also be noted that interior layer 180 extends to edges of knitted component 130 that are joined with strobel sock 128, which effectively ties or joins interior layer 180 to sole structure 110.

Various materials may be utilized for interior layer 180. As an example, interior layer 180 may be a polymer layer with many of the properties of skin layer 140. Interior layer 180 may also be a textile, such as a microfiber textile, that is adhered or bonded to knitted component 130. In some configurations, interior layer 180 may have a layered configuration that includes a thermoplastic polymer material for thermal bonding with knitted component 130.

Although skin layer 140 may cover substantially all of knitted component 130, skin layer 140 may be absent from some areas of knitted component 130. With reference to examples discussed above, skin layer 140 may be absent from throat area 124 or ankle region 107. As another example, FIG. 25A depicts skin layer 140 as being present in areas corresponding with midfoot region 103 and areas that include inlaid strand 132, but absent in areas corresponding with forefoot region 101 and heel region 103. Moreover, skin layer 140 covers some of protruding areas 133, but leaves other protruding areas 133 exposed. Accordingly, skin layer 140 may only cover specific areas of knitted component 130, thereby leaving other areas of knitted component 130 exposed.

Figure 25B:
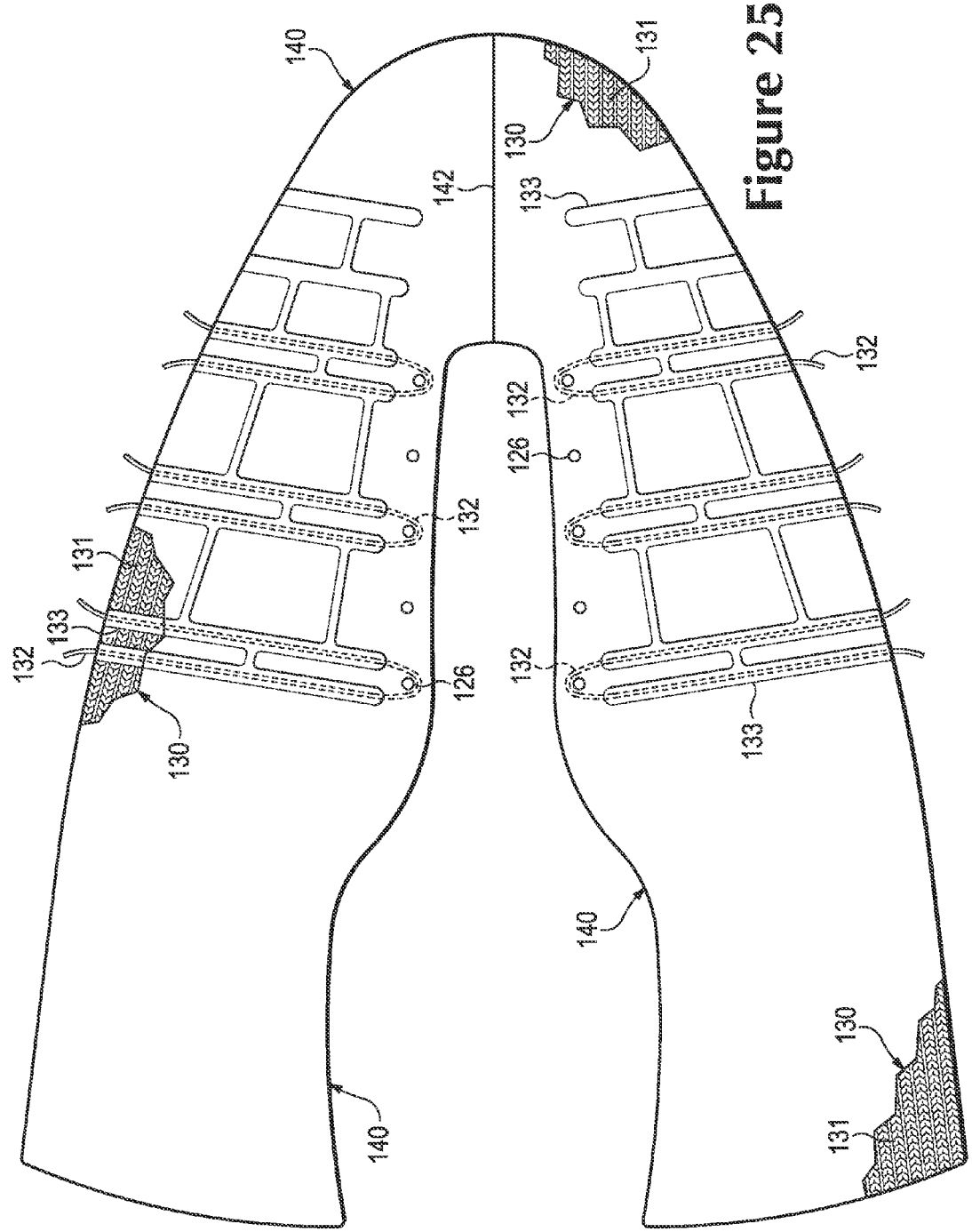

A single element of skin layer 140 is secured to knitted component 130 in many configurations discussed above. Referring to FIG. 25B, a parting line 142 extends longitudinally through an area corresponding with forefoot region 101, thereby separating different sections of skin layer 140. In this configuration, each section of skin layer 140 may have different properties. More particularly, the material forming skin layer 140, the thickness of the material, or other properties may vary between the sections of skin layer 140, thereby imparting different properties to different areas of upper 120. In further configurations, parting line 142 may be located in other areas, or the sections of skin layer 140 may be spaced from each other to expose a portion of knitted component 130.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A method for manufacturing an upper for an article of footwear, the method comprising:

forming a knitted component to include a throat area, an attachment area, a first tubular structure, and a second tubular structure, the attachment area configured to be attached to a sole structure, the first tubular structure and the second tubular structure extending from the throat area to the attachment area, the first tubular structure and the second tubular structure being separated by an adjacent region, the first tubular structure and the second tubular structure projecting from the adjacent region, at least one of the first tubular structure and the second tubular structure defining a protrusion that has a different thickness from the adjacent region, the protrusion including a first area and a second area, the first area and the second area projecting in opposite directions from the adjacent region;

positioning a skin layer adjacent to the knitted component and in an overlapping configuration such that the skin layer overlaps the first tubular structure, the second tubular structure, and the adjacent region, the skin layer overlapping the first area;

locating the skin layer and the knitted component between a first surface and a second surface of a press, the first surface including a first material, and the second surface including a second material, the first material having greater compressibility than the second material; and compressing the skin layer and the knitted component between the first surface and the second surface to join the skin layer to the knitted component;

protruding the first area of the protrusion and the skin layer together into the first material to a first depth; and protruding the second area of the protrusion into the second material to a second depth;

wherein an inlaid strand extends through the first tubular structure;

wherein a plurality of yarn sections are within the second tubular structure and extend across the second tubular structure; and wherein the first depth is greater than the second depth.

2. The method recited in claim 1, wherein the step of locating includes selecting (a) the first material to have a first hardness and (b) the second material to have a second hardness, the first hardness being less than the second hardness.

3. The method recited in claim 1, wherein the step of locating includes selecting (a) the first material to have a first thickness and (b) the second material to have a second thickness, the first thickness being greater than the second thickness.

4. The method recited in claim 1, wherein the step of locating includes selecting the first material to be silicone.

5. The method recited in claim 1, wherein the step of locating includes selecting each of the first material and the second material to be silicone.

6. The method recited in claim 1, further including a step of heating the skin layer and the knitted component.

7. The method recited in claim 1, further including a step of incorporating the skin layer and the knitted component into the upper of the article of footwear following the step of compressing.

8. The method recited in claim 7, wherein the step of incorporating includes positioning the skin layer to form a portion of an exterior surface of the article of footwear.

9. The method recited in claim 1, further including a step of selecting the skin layer to include a thermoplastic polymer material.

10. The method recited in claim 1, wherein the step of compressing the skin layer and the knitted component between the first surface and the second surface includes joining the skin layer to the first area of the protrusion and the adjacent region.

11. The method recited in claim 1, wherein compressing the skin layer and the knitted component includes joining the skin layer to the first tubular structure, the adjacent region, and the second tubular structure.

12. The method recited in claim 11, wherein the first tubular structure defines the protrusion;

wherein the second tubular structure includes a third area and a fourth area that project in opposite directions from the adjacent region;

the method further comprising:

protruding the third area of the second tubular structure and the skin layer together into the first material to a third depth; and protruding the fourth area of the second tubular structure into the second material to a fourth depth;

wherein the third depth is greater than the fourth depth.

13. A method of manufacturing an element, the method comprising:

forming a knitted component to include a throat area, an attachment area, a first tubular structure, and a second tubular structure, the attachment area configured to be attached to a sole structure, the first tubular structure and the second tubular structure extending from the throat area to the attachment area, the first tubular structure and the second tubular structure being separated by an adjacent region, the first tubular structure and the second tubular structure projecting from the adjacent region, at least one of the first tubular structure and the second tubular structure defining a protrusion that has a greater thickness than the adjacent region, the protrusion including a first area and a second area, the first area and the second area projecting in opposite directions from the adjacent region;

positioning a skin layer adjacent to the knitted component and in an overlapping configuration such that the skin layer overlaps the first tubular structure, the second tubular structure, and the adjacent region, the skin layer overlapping the first area;

locating the skin layer and the knitted component between a first surface and a second surface of a press, the skin layer being located adjacent to the first surface, and the knitted component being located adjacent to the second surface, the first surface including a first material, and the second surface including a second material, the first material having greater compressibility than the second material, and each of the first surface and the second surface having a substantially planar configuration;

heating the skin layer and the knitted component; and compressing the skin layer and the knitted component between the first surface and the second surface such that (a) the skin layer together with the first area of the protrusion protrude into the first surface to a first depth, (b) portions of the skin layer that are in contact with the adjacent region of the knitted component protrude into the first surface to a second depth, and (c) the second area of the protrusion protrudes into the second surface to a third depth, the first depth being greater than the second depth, and the first depth being greater than the third depth;

wherein an inlaid strand extends through the first tubular structure; and wherein a plurality of yarn sections are within the second tubular structure and extend across the second tubular structure.

14. The method recited in claim 13, wherein the step of locating includes selecting (a) the first material to have a first hardness and (b) the second material to have a second hardness, the first hardness being less than the second hardness.

15. The method recited in claim 13, wherein the step of locating includes selecting (a) the first material to have a first thickness and (b) the second material to have a second thickness, the first thickness being greater than the second thickness.

16. The method recited in claim 13, wherein the step of locating includes selecting the first material to be silicone.

17. The method recited in claim 13, wherein the step of locating includes selecting each of the first material and the second material to be silicone.

18. The method recited in claim 13, further including a step of incorporating the skin layer and the knitted component into an article of footwear following the step of compressing.

19. The method recited in claim 18, wherein the step of incorporating includes positioning the skin layer to form a portion of an exterior surface of the article of footwear.

20. The method recited in claim 13, further including a step of selecting the skin layer to include a thermoplastic polymer material.

* * * * *